United States Patent
Ishido

(10) Patent No.: US 11,126,130 B2
(45) Date of Patent: Sep. 21, 2021

(54) OPTICAL SENSOR AND IMAGE FORMING APPARATUS

(71) Applicant: CANON KABUSHIKI KAISHA, Tokyo (JP)

(72) Inventor: Katsuhiro Ishido, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/532,805

(22) Filed: Aug. 6, 2019

(65) Prior Publication Data

US 2020/0057408 A1     Feb. 20, 2020

(30) Foreign Application Priority Data

Aug. 14, 2018   (JP) .............................. JP2018-152594
Aug. 14, 2018   (JP) .............................. JP2018-152595

(51) Int. Cl.
*G03G 15/00*     (2006.01)

(52) U.S. Cl.
CPC ..... *G03G 15/80* (2013.01); *G03G 2215/0404* (2013.01); *G03G 2215/0409* (2013.01); *G03G 2215/0891* (2013.01); *G03G 2217/005* (2013.01)

(58) Field of Classification Search
CPC .......... G03G 15/80; G03G 2215/0404; G03G 2215/0409; G03G 2215/0891; G03G 2217/005
See application file for complete search history.

(56) References Cited

U.S. PATENT DOCUMENTS

| | | | |
|---|---|---|---|
| 7,139,511 B2 | 11/2006 | Ishibashi | |
| 9,377,739 B2 | 6/2016 | Masuda | |
| 2015/0362878 A1 | 12/2015 | Nagashima | |
| 2016/0112580 A1 | 4/2016 | Muto et al. | |

FOREIGN PATENT DOCUMENTS

| | | |
|---|---|---|
| EP | 3 165 969 A1 | 5/2017 |
| JP | 2004-279664 A | 10/2004 |
| JP | 2005-091252 A | 4/2005 |
| JP | 2013-031333 A | 2/2013 |

OTHER PUBLICATIONS

Extended European Search Report dated Jan. 27, 2020, in European Patent Application No. 19191397.9.

*Primary Examiner* — Lamson D Nguyen
(74) *Attorney, Agent, or Firm* — Venable LLP

(57) ABSTRACT

An optical sensor includes a first light emitting diode (LED), a second LED, a first photodiode (PD), and a second PD. The first LED and the second LED are configured to irradiate an optical-axis center point of an intermediate transfer belt. The first PD is arranged at a position at which specularly reflected light of light emitted from the first LED and diffused reflected light of light emitted from the second LED are received. The second PD is arranged at a position at which diffused reflected light of the light emitted from the first LED is received.

20 Claims, 16 Drawing Sheets

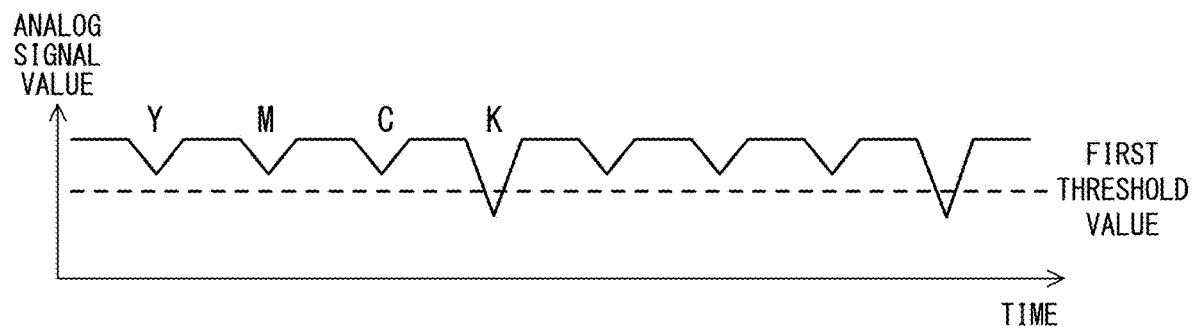
FIG. 8
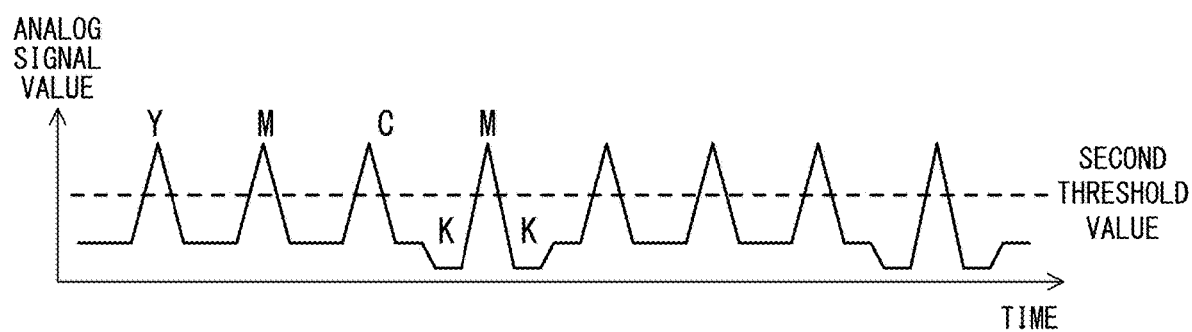
FIG. 9
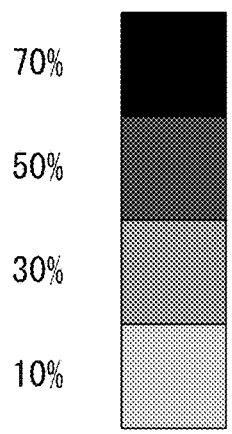 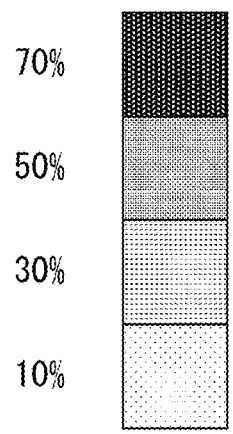
FIG. 10A　　　　FIG. 10B

OPTICAL SENSOR AND IMAGE FORMING APPARATUS

BACKGROUND OF THE INVENTION

Field of the Invention

The present disclosure relates to an optical sensor including a plurality of light emitting elements configured to irradiate an image bearing member with light, and a plurality of light receiving elements configured to receive reflected light of light emitted from the plurality of light emitting elements, and to an image forming apparatus including the optical sensor.

Description of the Related Art

An electrophotographic image forming apparatus is configured to form images of colors of yellow (Y), magenta (M), cyan (C), and black (K) on a sheet through electrophotographic processes of charging, exposing, developing, and transferring. Densities of the images formed on the sheet are varied depending on temperature and humidity of the image forming apparatus, the number of prints of the image forming apparatus, and operating time of the image forming apparatus. To address this problem, the image forming apparatus is configured to adjust an image density. For example, the image forming apparatus is configured to form a detection image on an image bearing member, which is different from the sheet, detect the detection image formed on the image bearing member by an optical sensor included in the image forming apparatus, and adjust an image forming condition for the image density based on a result of the detection.

The image forming apparatus is also configured to superimpose images of different colors to form an image of mixed colors. Therefore, when image forming positions of the yellow image, the magenta image, the cyan image, and the black image are different, a tint of the image of the mixed colors does not become a desired tint. This is called "color misregistration". It is known that the color misregistration is also varied depending on the temperature and humidity of the image forming apparatus, the number of prints of the image forming apparatus, and the operating time of the image forming apparatus as with the densities of the images described above. In order to address this problem, the image forming apparatus is configured to correct the color misregistration before the tint of the color image is changed. For example, the image forming apparatus is configured to form a detection image of a different color for detecting the color misregistration on the image bearing member, detect the detection image by the optical sensor, and detect a color misregistration amount based on a result of the detection. The image forming apparatus is configured to adjust the image forming positions of the respective colors based on the detected color misregistration amount.

The optical sensor included in the image forming apparatus includes a light emitter, and a light receiver configured to receive reflected light from the detection image on the image bearing member. Methods of detecting the detection image by the optical sensor include a specularly reflected light method of detecting specularly reflected light from the detection image, and a diffused reflected light method of detecting diffused reflected light from the detection image.

For example, an image forming apparatus described in Japanese Patent Application Laid-open No. 2013-31333 is configured to execute, by an optical sensor including two light emitting elements and two light receiving elements, processing of detecting specularly reflected light from a detection image, and processing of detecting diffused reflected light from the detection image. However, the optical sensor described in Japanese Patent Application Laid-open No. 2013-31333 is difficult to downsize because both of the light emitting elements and the light receiving elements are bullet elements.

SUMMARY OF THE INVENTION

According to one aspect of the present invention, an optical sensor configured to measure an unfinished measurement image formed with toner includes a substrate; a first light emitting element formed on a predetermined surface of the substrate; a second light emitting element formed on the predetermined surface; a first light receiving element, which is formed on the predetermined surface, configured to receive specularly reflected light, wherein the specularly reflected light is changed with an amount of toner of the unfinished measurement image in a case where the first light emitting element emits light to the unfinished measurement image; and a second light receiving element, which is formed on the predetermined surface, and is configured to receive diffused reflected light, wherein the diffused reflected light is changed with the amount of toner of the unfinished measurement image in a case where the second light emitting element emits light to the unfinished measurement image.

Further features of the present invention will become apparent from the following description of exemplary embodiments (with reference to the attached drawings).

BRIEF DESCRIPTION OF THE DRAWINGS

FIG. 8 is a graph for showing an example of an analog signal corresponding to a result of detecting the first pattern images for detecting the color misregistration.

FIG. 9 is a graph for showing an example of an analog signal corresponding to a result of detecting the second pattern images for detecting the color misregistration.

FIG. 10A and FIG. 10B are explanatory diagrams of test images for detecting an image density.

DESCRIPTION OF THE EMBODIMENTS

Now, embodiments of the present disclosure are described in detail with reference to the drawings.

First Embodiment

Overall Configuration

Figure 1:
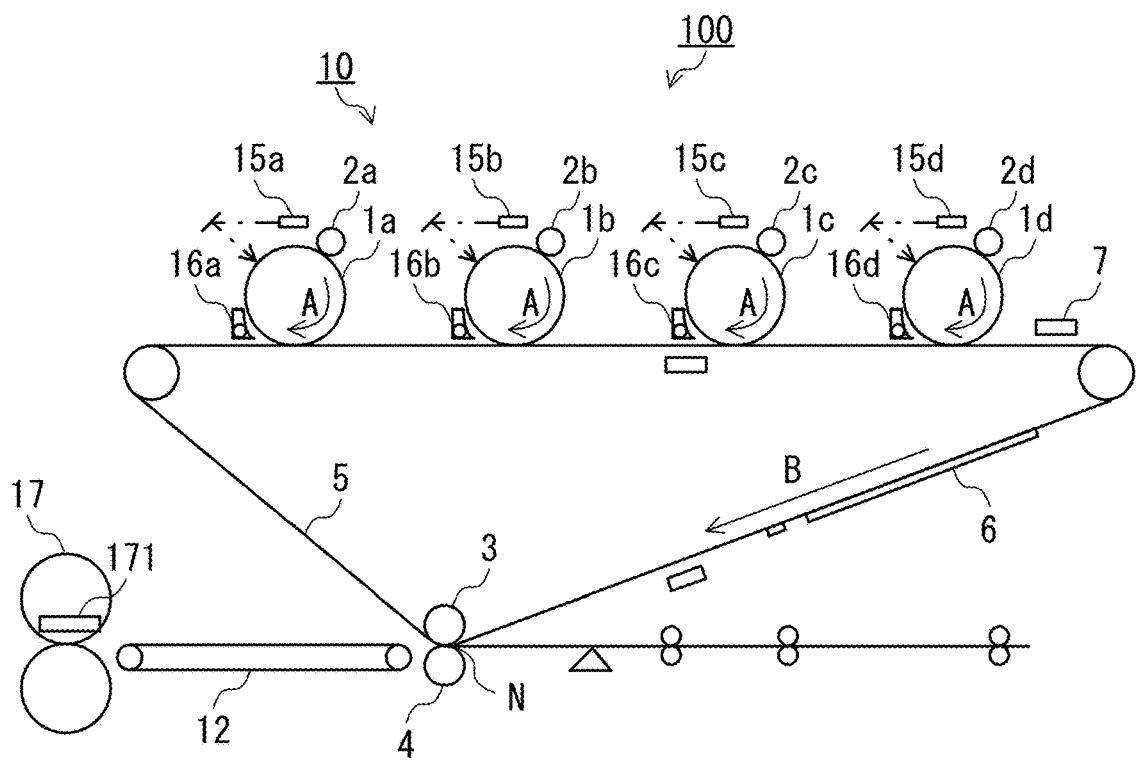
FIG. 1 is a schematic cross-sectional view of an image forming apparatus according to at least one embodiment of the present disclosure.

FIG. 1 is a schematic cross-sectional view of an image forming apparatus 100 according to a first embodiment of the present disclosure. The image forming apparatus 100 includes photosensitive drums 1a to 1d, charging devices 2a to 2d, exposure devices 15a to 15d, developing devices 16a to 16d, an intermediate transfer belt 5, a belt support roller 3, a transfer roller 4, and a fixing device 17. In the following description, the photosensitive drums 1a to 1d, the charging devices 2a to 2d, the exposure devices 15a to 15d, and the developing devices 16a to 16d are referred to as an "image forming unit 10" configured to form toner images of respective colors of yellow (Y), cyan (C), magenta (M), and black (K). The letter "a" suffixed to the reference signs represents a configuration for forming the yellow image. The letter "b" suffixed to the reference signs represents a configuration for forming the cyan image. The letter "c" suffixed to the reference signs represents a configuration for forming the magenta image. The letter "d" suffixed to the reference signs represents a configuration for forming the black image.

The intermediate transfer belt 5 is stretched around a plurality of rollers including a drive roller and the belt support roller 3. To the intermediate transfer belt 5, the toner images formed by the image forming unit 10 are transferred. The intermediate transfer belt 5 serves as an image bearing member configured to bear and convey the toner images. Moreover, the intermediate transfer belt 5 also serves as an intermediate transfer member, to which the toner images are to be transferred. The transfer roller 4 is arranged on a side opposite to the belt support roller 3 with respect to the intermediate transfer belt 5. A nip portion N formed by the transfer roller 4 pressing the intermediate transfer belt 5 is called a "transfer portion". The sheet is conveyed to the transfer portion by conveyance rollers. The transfer roller 4 is configured to transfer the toner images formed on the intermediate transfer belt 5 onto the sheet at the transfer portion.

The photosensitive drums 1a, 1b, 1c, and 1d are each rotated in a direction of the arrow A. The photosensitive drums 1a, 1b, 1c, and 1d each have a photosensitive layer on a surface thereof. The photosensitive drums 1a, 1b, 1c, and 1d serve as photosensitive members. The charging devices 2a, 2b, 2c, and 2d are configured to charge the surfaces of the photosensitive drums 1a, 1b, 1c, and 1d, respectively. The exposure devices 15a, 15b, 15c, and 15d are configured to expose the charged surfaces of the photosensitive drums 1a, 1b, 1c, and 1d to light, respectively. The surfaces of the photosensitive drums 1a, 1b, 1c, and 1d are scanned with laser light emitted from the exposure devices 15a, 15b, 15c, and 15d so that electrostatic latent images are formed on the surfaces of the photosensitive drums 1a, 1b, 1c, and 1d, respectively. The developing devices 16a, 16b, 16c, and 16d are configured to develop the electrostatic latent images with toner (developer) to form the toner images of respective colors on the photosensitive drums 1a, 1b, 1c, and 1d, respectively.

The drive roller of the intermediate transfer belt 5 is rotated to rotate the intermediate transfer belt 5 in a direction of the arrow B. The toner images of respective colors formed on the photosensitive drums 1a, 1b, 1c, and 1d are sequentially transferred onto the intermediate transfer belt 5, which is the image bearing member, in an overlapping manner. As a result, a full-color toner image 6 is formed on the intermediate transfer belt 5.

The intermediate transfer belt 5 is rotated to convey the toner image 6 to the transfer portion. The toner image 6 is transferred onto the sheet when passing through the transfer portion. The sheet having the toner image 6 transferred thereto is conveyed to the fixing device 17 by a conveyance belt 12. The fixing device 17 includes a heater 171. The heater 171 is configured to heat the toner image 6 to fix the toner image 6 onto the sheet. Then, the sheet is delivered to a tray (not shown) of the image forming apparatus 100. In this manner, image forming processing by the image forming apparatus 100 is ended.

On a downstream side of the photosensitive drum 1d in a conveyance direction (direction B) of the intermediate transfer belt 5, an optical sensor 7 is arranged. The optical sensor 7 is configured to detect pattern images for detecting color misregistration and a test image for detecting an image density, which are formed on the intermediate transfer belt 5. A result of detecting the pattern images is used to determine a color misregistration amount, which is used for color misregistration correction. A result of detecting the test image is used to determine a correction amount to be used for image density correction. In the following, when the pattern images and the test image are not distinguished, the pattern images and the test image are referred to as a "detection image".

The toner images of respective colors, which are transferred from the photosensitive drums 1a to 1d onto the intermediate transfer belt 5, may be shifted in transfer position on the intermediate transfer belt 5. It is known that this is caused by an increase in temperature of the exposure devices 15a to 15d. The shift in transfer position causes color misregistration, which changes a hue and a color tone of the full-color image. To address this problem, the image forming apparatus 100 is configured to detect the pattern images by the optical sensor 7, and correct the color misregistration detected by a result of the detection.

Moreover, the image forming apparatus 100 may vary in density of the image to be formed due to a usage environment (temperature and humidity) and an increase in the number of prints. To address this problem, the image forming apparatus 100 is configured to detect the test image, and perform image density correction, in which an image forming condition regarding an image density is controlled based on a result of detecting the test image. In this case, the image forming condition regarding the image density includes intensities of laser light to be emitted by the exposure devices 15a to 15d, developing biases to be applied to the developing devices 16a to 16d, charging biases to be applied to the charging devices 2a to 2d, or transfer biases to be applied to the transfer roller 4, for example. In order to correct the image density, the image forming apparatus 100 may control a plurality of image forming conditions, or control only a particular image forming condition.

Optical Sensor

Figure 2:
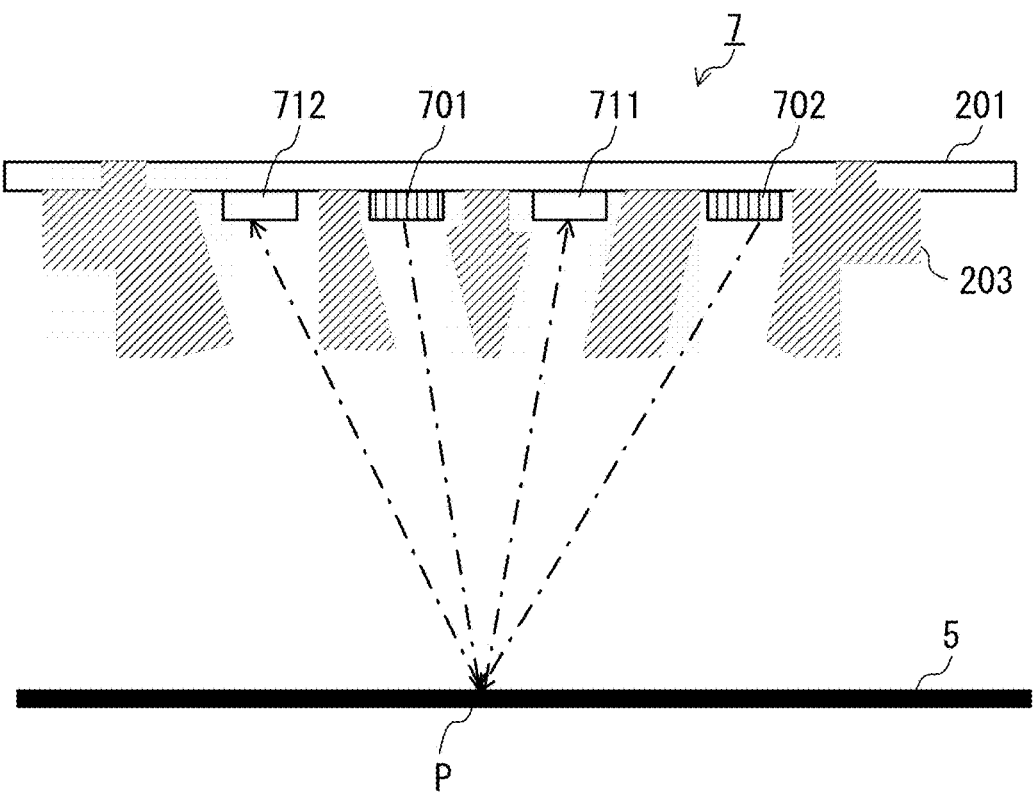
FIG. 2 is a schematic view of a main part of an optical sensor according to at least one embodiment of the present disclosure.

FIG. 2 is an explanatory view of the optical sensor 7. The optical sensor 7 includes two light emitting elements and two light receiving elements. The optical sensor 7 includes a first light emitting diode (LED) 701 and a second LED 702 as the light emitting elements. The optical sensor 7 includes a first photodiode (PD) 711 and a second PD 712 as the light receiving elements. The first LED 701, the second LED 702, the first PD 711, and the second PD 712 are bonded to a predetermined surface (mounting surface) of the same substrate 201 by die bonding and wire bonding. Optical axes of light emitted from the first LED 701 and the second LED 702 are orthogonal to the predetermined surface (mounting surface) of the substrate 201. Further, optical axes of reflected light received by the first PD 711 and the second PD 712 are also orthogonal to the predetermined surface (mounting surface) of the substrate 201.

Because all elements are mounted on the predetermined surface (mounting surface) of the substrate 201, the plurality of elements can be mounted on the substrate 201 when a reflow step is performed once. As a result, a manufacturing cost of the optical sensor 7 can be reduced as compared to a manufacturing cost of an optical sensor in which a plurality of elements are mounted on both sides of the substrate 201. The substrate 201 is a printed circuit board (PCB), for example, but the present disclosure is not limited thereto. The first LED 701, the second LED 702, the first PD 711, and the second PD 712 are electrically connected to a power supply circuit (not shown) and a detection circuit (not shown), for example, via the substrate 201.

The first LED 701 is configured to emit light to an object to be measured (intermediate transfer belt 5 or detection image on the intermediate transfer belt 5). The first PD 711 is arranged at a position at which, when the first LED 701 emits light, specularly reflected light from the object to be measured can be received. An optical-axis center point P of FIG. 2 indicates a position at which the light emitted from the first LED 701 to the intermediate transfer belt 5 is reflected. In other words, the first LED 701 and the first PD 711 are arranged such that the light emitted from the first LED 701 is specularly reflected (so that an angle of incidence and an angle of reflection are equal to each other) at the optical-axis center point P, and the reflected light is received by the first PD 711. The optical-axis center point P is a detection position of the optical sensor 7.

The second LED 702 is arranged at a position at which specularly reflected light of light emitted to the intermediate transfer belt 5 is not received by the first PD 711 or the second PD 712. In other words, the second LED 702 is arranged such that, even when the light emitted from the second LED 702 is specularly reflected at the optical-axis center point P of the intermediate transfer belt 5, the reflected light is not received by the first PD 711 or the second PD 712. Even when the light emitted from the second LED 702 is specularly reflected by the detection image, the specularly reflected light from the detection image is not received by the first PD 711 or the second PD 712. The second LED 702 is arranged at a position at which diffused reflected light of the light emitted to the intermediate transfer belt 5 is received by the first PD 711. The first LED 701 and the second LED 702 are arranged so as to irradiate the optical-axis center point P, which is the same position. The second PD 712 is arranged at a position at which diffused reflected light of light emitted from the first LED 701 to the intermediate transfer belt 5 is received.

The substrate 201 is mounted to a housing 203. The housing 203 has light guide paths for guiding irradiation light so that light emitted from the first LED 701 and the second LED 702 efficiently irradiate the intermediate transfer belt 5. The housing 203 also has light guide paths for guiding the reflected light so that the first PD 711 and the second PD 712 efficiently receive the reflected light from the intermediate transfer belt 5.

In other words, the light emitted from the first LED 701 travels in the direction of the optical axis (one-dot broken line in FIG. 2), and irradiates the intermediate transfer belt 5, with the light guide path formed in the housing 203. The specularly reflected light from the intermediate transfer belt 5 or the detection image travels in the direction of the optical axis (one-dot broken line in FIG. 2), and reaches the first PD 711.

The light emitted from the second LED 702 travels in the direction of the optical axis (one-dot broken line in FIG. 2), and irradiates the intermediate transfer belt 5, with the light guide path in the housing 203.

The first PD 711 is configured to receive diffused reflected light of the light with which the second LED 702 has irradiated the intermediate transfer belt 5.

The second PD 712 is configured to receive diffused reflected light of the light with which the first LED 701 has irradiated the intermediate transfer belt 5.

The first LED 701, the second LED 702, the first PD 711, and the second PD 712 are mounted on the same substrate 201, and hence the elements can be mounted substantially in parallel to the intermediate transfer belt 5. Therefore, the shift of the optical axis from the optical-axis center point P can be reduced as compared to the case of forming the elements by bullet elements with lead pins, for example. Further, the first LED 701, the second LED 702, the first PD 711, and the second PD 712 are elements bonded to the substrate 201 by die bonding and wire bonding, and hence can be reduced in element interval. Therefore, the entire size of the optical sensor 7 can be reduced. For example, while a general element is about 3 mm×about 2 mm×about 1 mm, the bullet elements have dimensions of about 5 mm×about 10 mm×about 5 mm even without the lead pins. Therefore, a part volume can be significantly reduced, and the optical sensor 7 itself can be downsized.

Figure 3A:
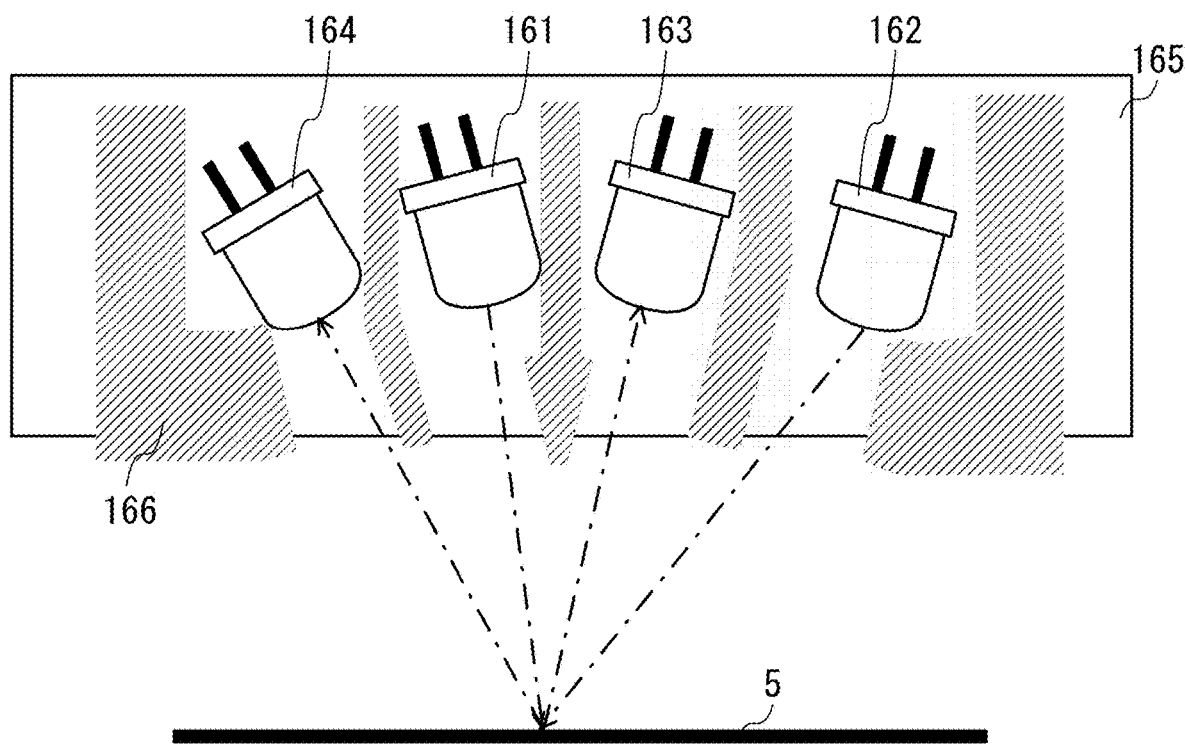
FIG. 3A and FIG. 3B are schematic views of a main part of an optical sensor including bullet elements.
Figure 3B:
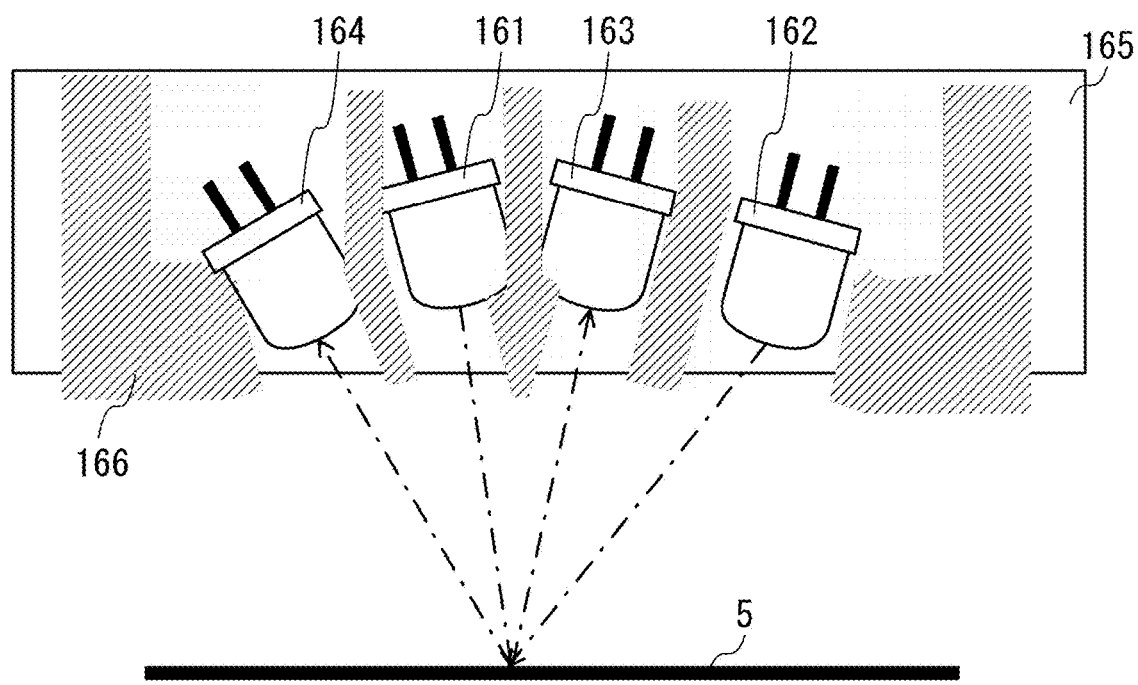

Now, as a comparative example, an optical sensor including bullet elements is described. FIG. 3A and FIG. 3B are explanatory views of the optical sensor including the bullet elements. When a positional relationship between light emitting elements 161 and 162 and light receiving elements 163 and 164 is achieved by a relationship similar to the case in which the elements are bonded to the substrate by die bonding and wire bonding (irradiation angle, receiving angle), it is required to bring the light emitting element 161 and the light receiving element 163 closer to each other. In FIG. 3B, a configuration example in this case is illustrated. When the light emitting element 161 and the light receiving element 163 have the positional relationship similar to that of FIG. 2 with respect to the intermediate transfer belt 5, the light emitting element 161 and the light receiving element 163 are brought too close to each other. As a result, a function as a light-shielding wall of a housing 166 provided on a substrate 165 is inhibited. Therefore, in order to prevent the light emitting elements 161 and 162 and the light receiving elements 163 and 164 from interfering with the light-shielding wall, it is required to increase the interval between the elements as in FIG. 3A, but in this case, the optical sensor is increased in size.

As described above, in the optical sensor 7 according to the first embodiment, the light emitting elements and the light receiving elements are bonded to the substrate 201 by die bonding and wire bonding. With the first LED 701, the second LED 702, the first PD 711, and the second PD 712 being bonded to the substrate 201 by die bonding and wire bonding, the distance between the elements can be reduced. As a result, the optical sensor 7 can be downsized as compared to the optical sensor including the bullet elements (FIG. 3A and FIG. 3B). Moreover, according to the optical sensor 7, the distance between the first LED 701 and the first PD 711 can be reduced, and hence the specularly reflected light of the light emitted to the object to be measured can be detected at an acuter angle than that of the optical sensor including the bullet light emitting elements and the bullet light receiving elements. As a result, even when the distance from the optical sensor 7 to the object to be measured is varied, an irradiation area on the object to be measured is hardly varied. When the intermediate transfer belt 5 is rotating, the distance from the optical sensor 7 to the detection image tends to be varied. According to the optical sensor 7 of the first embodiment, even when the distance from the optical sensor 7 to the detection image is varied, the irradiation area is hardly varied, and hence the specularly reflected light from the detection image can be detected with high accuracy. Further, the optical sensor 7 can reduce the distance between the first LED 701 and the first PD 711, and hence design flexibility is also increased. Therefore, according to the optical sensor 7, the first LED 701, the second LED 702, the first PD 711, and the second PD 712 can be arranged in a positional relationship that is suitable for detecting the specularly reflected light and the diffused reflected light from the object to be measured. In particular, in the optical sensor 7 in which the light emitting elements are shared or the light receiving elements are shared, the specularly reflected light and the diffused reflected light from the detection image can be detected more accurately than in the related-art optical sensor including the bullet elements.

Controller

Figure 4:
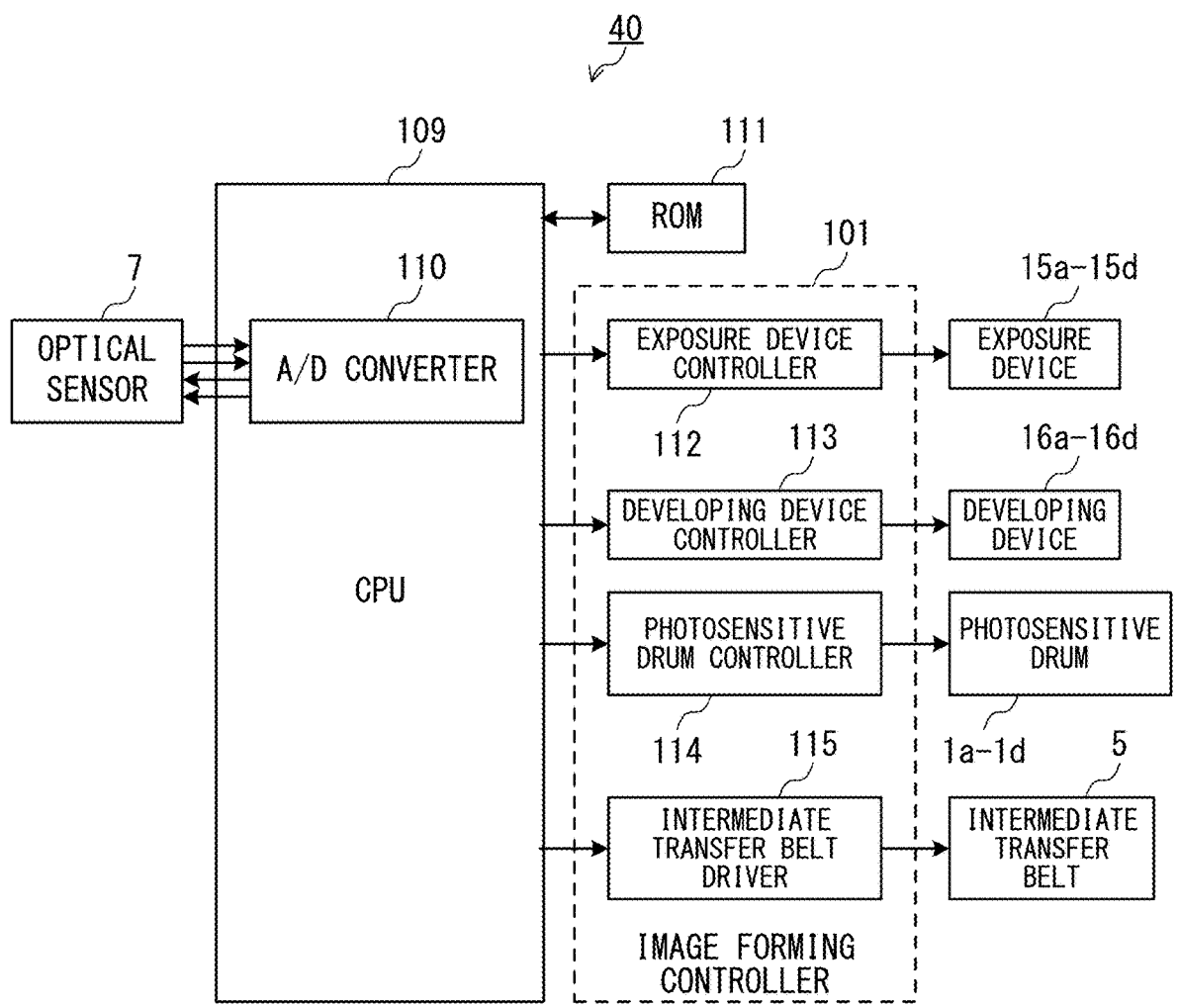
FIG. 4 is a control block diagram of the image forming apparatus.

Now, returning to the description of the image forming apparatus 100 of the first embodiment, FIG. 4 is an exemplary diagram of an example of a configuration of a controller configured to control the image forming apparatus 100. A controller 40 includes a central processing unit (CPU) 109, a read-only memory (ROM) 111, and an image forming controller 101. The CPU 109 includes an A/D converter 110. The image forming controller 101 includes an exposure device controller 112, a developing device controller 113, a photosensitive drum controller 114, and an intermediate transfer belt driver 115. The exposure device controller 112 is configured to control intensities of laser light emitted from light sources included in the exposure devices 15a to 15d.

The developing device controller 113 is configured to control motors for rotating developing rollers included in the developing devices 16a to 16d. The photosensitive drum controller 114 is configured to control motors for rotating the photosensitive drums 1a to 1d. The intermediate transfer belt driver 115 is configured to control a motor for rotating the intermediate transfer belt 5. The CPU 109 is configured to control the image forming apparatus 100 by executing a computer program stored in the ROM 111. The ROM 111 has stored therein, in addition to the computer program, pattern image data to be used to form the pattern images for the color misregistration detection, which are to be described later, and test image data to be used for forming the test image for the image density detection. The controller 40 may be implemented not only by executing the computer program, but also by a discrete part or a one-chip semiconductor product. The one-chip semiconductor product includes a micro-processing unit (MPU), an application specific integrated circuit (ASIC), or a system-on-a-chip (SOC), for example.

The CPU 109 is configured to control the optical sensor 7 to cause the first LED 701 and the second LED 702 to independently emit light (be lit).

The optical sensor 7 is configured to receive reflected light from the intermediate transfer belt 5 or the detection image formed on the intermediate transfer belt 5 by the first PD 711 and the second PD 712. The first PD 711 and the second PD 712 are configured to output, as a detection result, an analog signal obtained by converting the received reflected light into a voltage. The CPU 109 is configured to acquire analog signals output from the first PD 711 and the second PD 712 through the A/D converter 110. The CPU 109 is configured to store, in a memory (not shown), digital signals into which the analog signals are converted by the A/D converter 110.

The CPU 109 is configured to control the exposure devices 15a to 15d, the developing devices 16a to 16d, and the photosensitive drums 1a to 1d by the image forming controller 101 to form the detection image on the intermediate transfer belt 5. The CPU 109 is configured to cause the first LED 701 and the second LED 702 of the optical sensor 7 to be lit. The first LED 701 and the second LED 702 are configured to irradiate the surface (front surface) of the intermediate transfer belt 5, on which the detection image is to be formed, and the detection image formed on the intermediate transfer belt 5. The first PD 711 and the second PD 712 are configured to receive reflected light from the front surface of the intermediate transfer belt 5 and the detection image formed on the intermediate transfer belt 5 to output an analog signal corresponding to the reflected light. The CPU 109 is configured to detect the color misregistration amount and the image density in accordance with the analog signals output from the first PD 711 and the second PD 712 to perform the color misregistration correction and the image density correction.

Pattern Images

Figure 5:
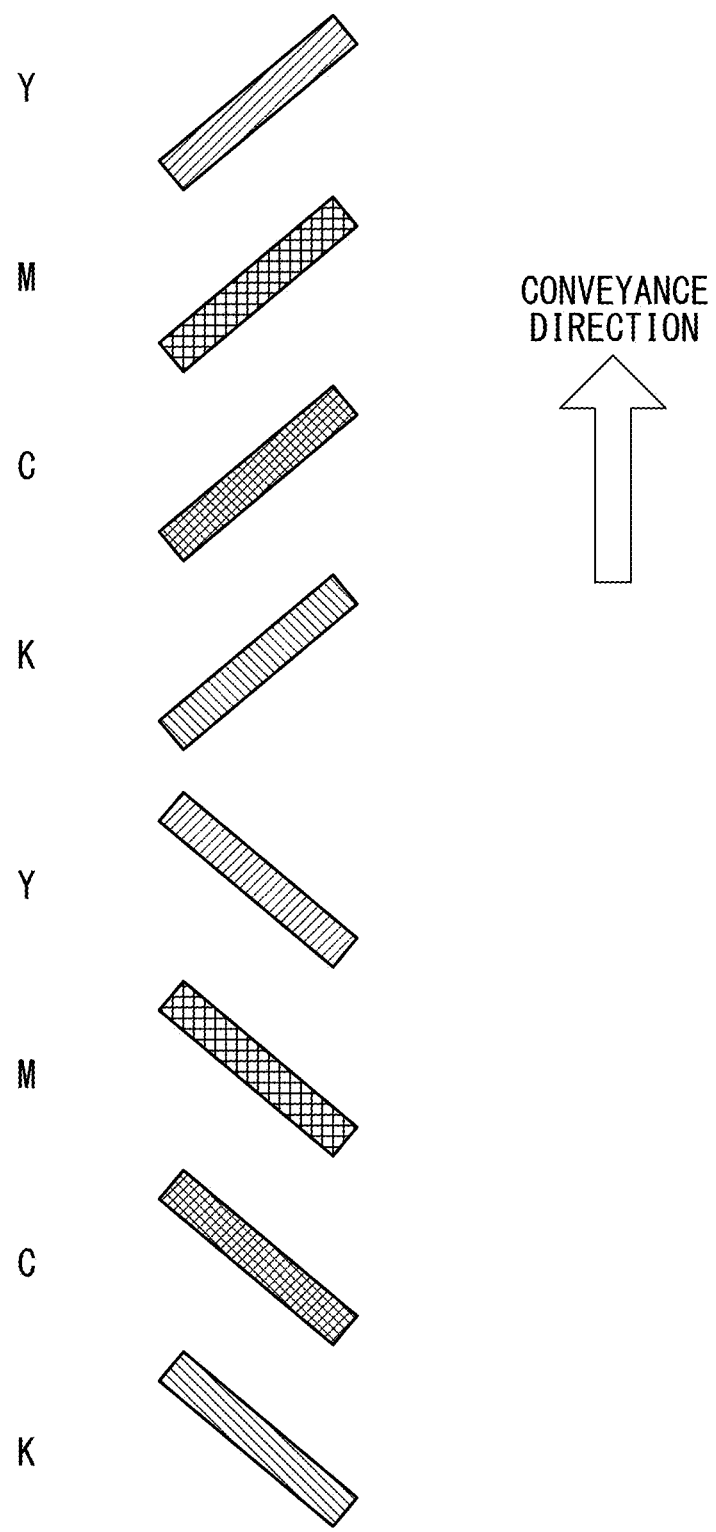
FIG. 5 is an explanatory diagram of first pattern images for detecting color misregistration.

FIG. 5 is an explanatory diagram of first pattern images for the color misregistration detection. The first pattern images include color patterns of yellow, which is a reference color, and color patterns of other colors (magenta, cyan, and black). The color patterns are images formed to be inclined at a predetermined angle (for example, 45°) with respect to the conveyance direction of the intermediate transfer belt 5. Two pattern images of the same colors are formed. The pattern images of the same colors are formed to be inclined in different directions with respect to the conveyance direction of the intermediate transfer belt 5.

The first pattern images are used in the case where the first PD 711 receives the specularly reflected light of the light emitted from the first LED 701. In other words, when an amount of the reflected light from the intermediate transfer belt 5 is a predetermined amount or more, the color misregistration amount is detected with the use of the first pattern images. When a gloss of the front surface of the intermediate transfer belt 5 is not reduced, an amount of the specularly reflected light from the front surface of the intermediate transfer belt 5 becomes larger than an amount of specularly reflected light from the first pattern images. Therefore, an analog signal value corresponding to a result of receiving the reflected light from a region (front surface of the intermediate transfer belt 5) in which the first pattern images are not formed becomes higher than an analog signal value corresponding to a result of receiving the reflected light from the first pattern images.

Figure 6:
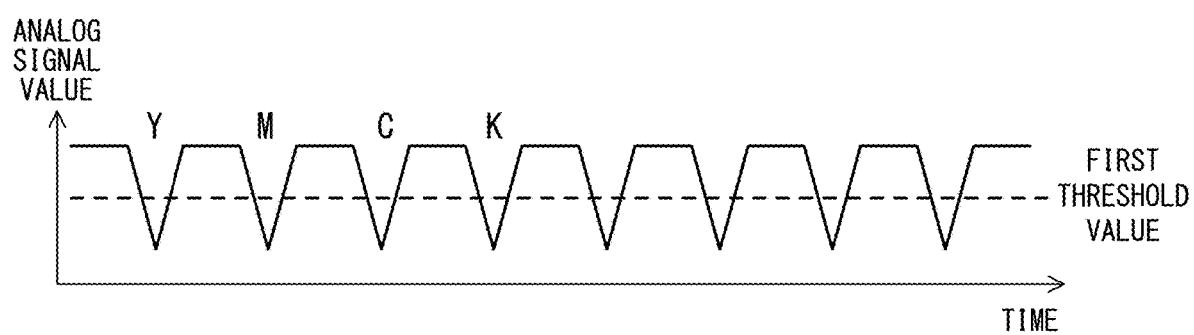
FIG. 6 is a graph for showing an example of an analog signal corresponding to a result of detecting the first pattern images for detecting the color misregistration.

FIG. 6 is a graph for showing an example of an analog signal in a case where reflected light from the first pattern images is detected by the first LED 701 and the first PD 711. An analog signal value of the first PD 711 obtained when reflected light from a color pattern is received is lower than an analog signal value of the first PD 711 obtained when the reflected light from the front surface of the intermediate transfer belt 5 is received.

The CPU 109 is configured to convert the analog signal into a binary signal indicating a first level or a second level based on a first threshold value. The converted signal corresponds to a result of comparison between the analog signal value (FIG. 6) and the first threshold value. At this time, the CPU 109 determines the first threshold value based on an analog signal value obtained when the specularly reflected light from the front surface of the intermediate transfer belt 5 of the light emitted from the first LED 701 is received by the first PD 711. Then, the CPU 109 detects a color misregistration amount of the color pattern of the first pattern images based on the binary signal described above. The color misregistration correction is a known technology, and a detailed description thereof is omitted here.

Figure 7A:
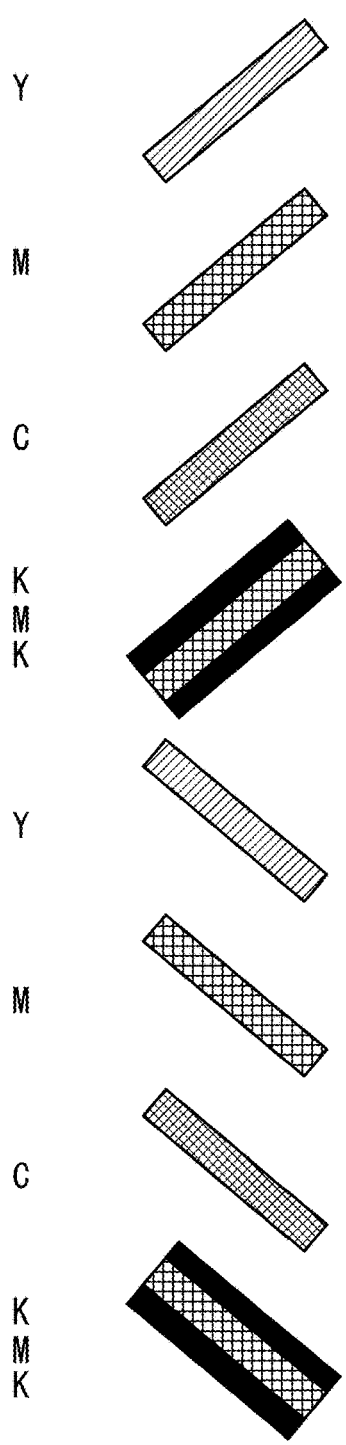
FIG. 7A and FIG. 7B are explanatory diagrams of second pattern images for detecting color misregistration.
Figure 7B:
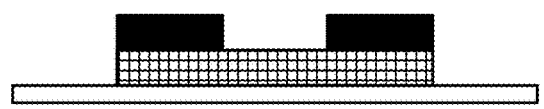

FIG. 7A and FIG. 7B are explanatory diagrams of second pattern images for the color misregistration detection. The second pattern images include color patterns of yellow, which is a reference color, and color patterns of other colors (magenta, cyan, and black). It should be noted, however, that the color patterns of black of the second pattern images are formed to be superimposed on the color patterns of magenta. The second pattern images are used when diffused reflected light of the light emitted from the second LED 702 is received by the first PD 711. In other words, when the amount of the reflected light from the intermediate transfer belt 5 is not the predetermined amount or more, a color misregistration amount is detected with the use of the second pattern images. In other words, when the amount of reflected light from the intermediate transfer belt 5 is less than the predetermined amount, the color misregistration amount is detected with the use of the second pattern images.

When the gloss of the intermediate transfer belt 5 is reduced by wearing of the intermediate transfer belt 5, the amount of specularly reflected light from the front surface of the intermediate transfer belt 5 is reduced. FIG. 8 is a graph for showing an example of an analog signal obtained when the reflected light from the first pattern images is detected by the first LED 701 and the first PD 711 under a state in which the gloss of the intermediate transfer belt 5 is reduced. When the amount of specularly reflected light from the intermediate transfer belt 5 is reduced, as shown in FIG. 8, a difference between the analog signal value obtained when specularly reflected light from the color patterns of respective colors is received and the analog signal value obtained when the specularly reflected light from the intermediate transfer belt 5 is received is reduced. Therefore, in some cases, the CPU 109 may not detect the color misregistration amount from the binary signal with high accuracy.

To address this problem, when the amount of specularly reflected light from the front surface of the intermediate transfer belt 5 is reduced, the image forming apparatus 100 detects the color misregistration amount with the use of the second pattern images. When the image forming apparatus 100 detects the color misregistration amount with the use of the second pattern images, the optical sensor 7 causes the second LED 702 to emit light, and the first PD 711 receives diffused reflected light from the second pattern images. FIG. 9 is a graph for showing an example of an analog signal obtained when reflected light from the second pattern images is detected by the second LED 702 and the first PD 711.

As illustrated in FIG. 7A, the second pattern images are different from the first pattern images. Specifically, the color patterns of black are superimposed on the color patterns of magenta. When the color patterns of black are detected with the use of diffused reflected light, the light emitted from the second LED 702 is absorbed by a black toner. Therefore, a difference between the amount of diffused reflected light from the color patterns of only black and the amount of diffused reflected light from the intermediate transfer belt 5 becomes extremely smaller. In each of the color patterns of black of the second pattern images, a pattern formed with the use of a magenta toner is exposed from a gap of patterns formed at an interval with the use of the black toner. This is called a "composite pattern". A cross-sectional view of the composite pattern is illustrated in FIG. 7B. A result of detecting the second pattern images including the composite patterns is shown in FIG. 9. An analog signal value corresponding to diffused reflected light from the composite pattern is a value corresponding to diffused reflected light from a region of the composite pattern formed with the use of the magenta toner. The interval between the patterns of the black toner is determined in advance, and hence the CPU 109 can determine a color misregistration amount of the color patterns of black based on a relative position between the region of the composite pattern formed with the use of the magenta toner and the reference color patterns using a yellow toner.

The CPU 109 is configured to convert the analog signal (FIG. 9) into a binary signal indicating the first level or the second level based on a second threshold value. The converted signal corresponds to a result of comparison between the analog signal value (FIG. 9) and the second threshold value. At this time, the CPU 109 determines the second threshold value based on an analog signal value obtained when the diffused reflected light from the front surface of the intermediate transfer belt 5 of the light emitted from the second LED 702 is received by the first PD 711. Then, the CPU 109 detects a color misregistration amount of the color pattern of the second pattern images based on the binary signal described above. The color misregistration correction using a composite pattern is a known technology, and a detailed description thereof is omitted here.

In the image forming apparatus 100 according to the first embodiment, the color misregistration amount of the image is detected with the use of the above-mentioned pattern images (first pattern images and second pattern images). The CPU 109 detects positions of the color patterns of respective colors to calculate relative positions of the pattern images of other colors with respect to the pattern images of the reference color (yellow). The CPU 109 determines the color misregistration amounts of respective colors based on differences between the calculated relative positions and a target relative position. The CPU 109 controls timings of writing by the exposure devices 15*a* to 15*d* based on the determined color misregistration amounts to perform the color misregistration correction. Moreover, the CPU 109 may correct image data based on the detected color misregistration so that the color misregistration amounts of the image to be formed by the image forming unit 10 are suppressed, for example. The reference color is not limited to yellow, and may be magenta or cyan.

Test Image

FIG. 10A and FIG. 10B are explanatory diagrams of test images for the image density detection. In FIG. 10A, an example of a first test image for the image density detection to be detected with the specularly reflected light is illustrated. In FIG. 10B, an example of a second test image for the image density detection to be detected with diffused reflected light is illustrated.

The first test image is used when the specularly reflected light of the light emitted from the first LED 701 is received by the first PD 711. The first test image is used in detecting an image density of black, in particular. The black toner absorbs light, and hence an amount of diffused reflected light from a test image of black is extremely small. Therefore, when a density of an image formed by the black toner is to be detected, the CPU 109 detects specularly reflected light from the test image of black. The first test image is formed of a gradation pattern of four image densities: 70%, 50%, 30%, and 10%. The image forming unit 10 forms the first test image based on an image signal value of the test image data. The image signal value of the test image data is determined in advance.

The first test image formed on the intermediate transfer belt 5 is read by the optical sensor 7. The analog signal output from the first PD 711 is converted to the digital signal by the A/D converter 110. The CPU 109 controls the image forming condition for the image density based on a difference between the digital signal value and a target value. For example, the CPU 109 controls an intensity of laser light emitted from the exposure device 15*d* by the image forming controller 101 to adjust the image density of black.

Figure 11:
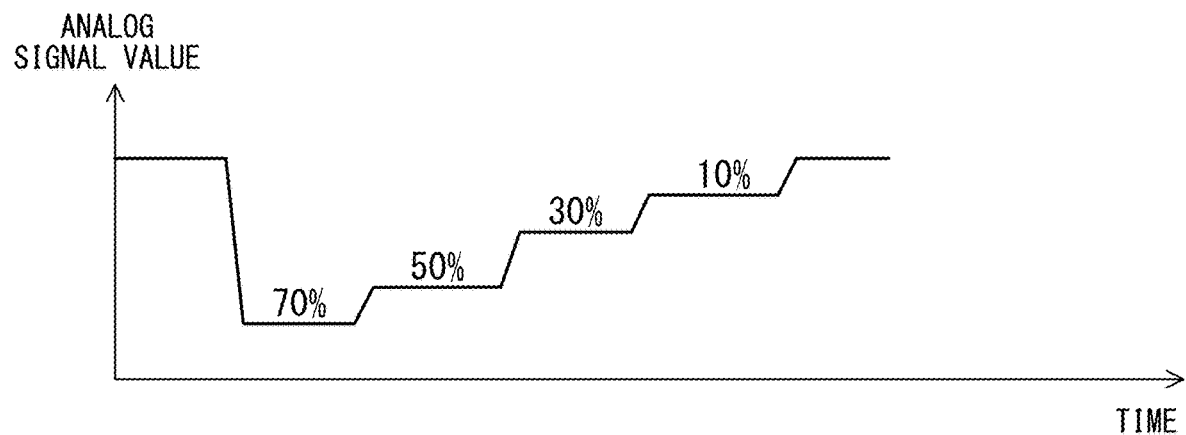
FIG. 11 is a graph for showing an example of an analog signal corresponding to a result of detecting a first test image for detecting the image density.

FIG. 11 is a graph for showing an example of an analog signal obtained when reflected light from the first test image is detected by the first LED 701 and the first PD 711. The image of the density of 70%, which is the highest density of the first test image, is reduced in the amount of specularly reflected light because a toner adhesion amount is large in addition to the fact that the light is absorbed by the black toner. Therefore, the analog signal value output by the optical sensor 7 (first PD 711) is reduced. The image of the density of 10%, which is the lowest density of the first test image, is reduced in the amount of light absorbed by the black toner as compared to the case of the density of 70%, and the toner adhesion amount is reduced, with the result that the amount of the specularly reflected light is increased. Therefore, the analog signal value output by the optical sensor 7 (first PD 711) is increased.

The second test image is used when diffused reflected light of light emitted from the first LED 701 is received by the second PD 712. The second test image is used in detecting image densities of chromatic colors, such as yellow, magenta, and cyan, in particular. Image densities for yellow, magenta, and cyan are detected with the use of diffused reflected light. The second test image is formed of a gradation pattern of four densities: 70%, 50%, 30%, and 10%. In FIG. 10B, a test image of yellow is illustrated. The second test images of the colors: yellow, magenta, and cyan are formed on the intermediate transfer belt 5.

The second test image formed on the intermediate transfer belt 5 is read by the optical sensor 7. The analog signal output from the second PD 712 is converted to the digital signal by the A/D converter 110. The CPU 109 controls the image forming condition for the image density based on a difference between the digital signal value and a target value. In this manner, the CPU 109 adjusts the image densities of yellow, magenta, and cyan.

Figure 12:
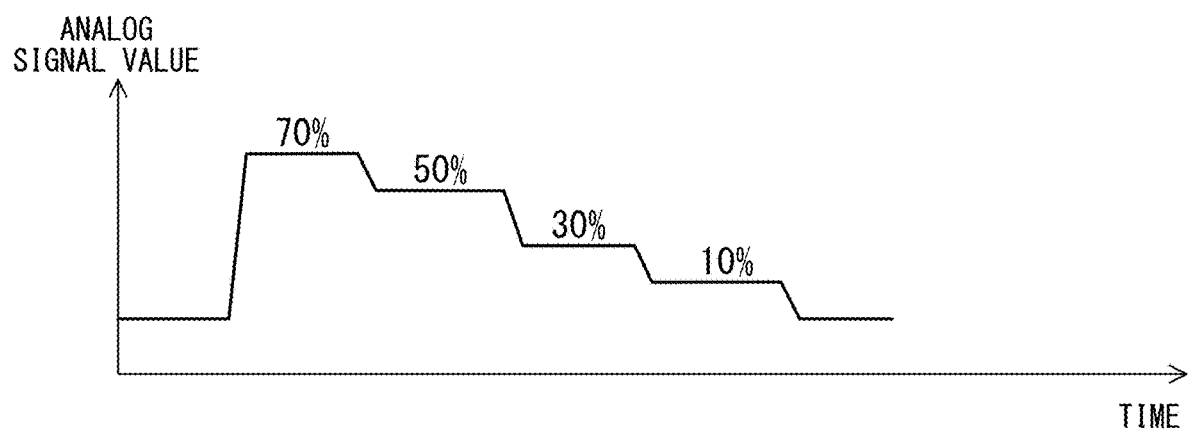
FIG. 12 is a graph for showing an example of an analog signal corresponding to a result of detecting a second test image for detecting the image density.

FIG. 12 is a graph for showing an example of an analog signal obtained when reflected light from the second test image is detected by the first LED 701 and the second PD 712. An analog signal of the second test image for yellow is illustrated here. The image of the density of 70%, which is the highest density of the second test image, is increased in the amount of diffused reflected light because a toner adhesion amount is large in addition to the fact that the light is reflected by the yellow toner. Therefore, the analog signal value output by the optical sensor 7 (second PD 712) is increased. The image of the density of 10%, which is the lowest density of the second test image, is reduced in the amount of light reflected by the yellow toner as compared to the case of the density of 70%, and the amount of the diffused reflected light is reduced. Therefore, the analog signal value output by the optical sensor 7 (second PD 712) is reduced. Analog signals obtained with the second test images of magenta and cyan exhibit similar tendencies.

Color Misregistration Correction

Figure 13:
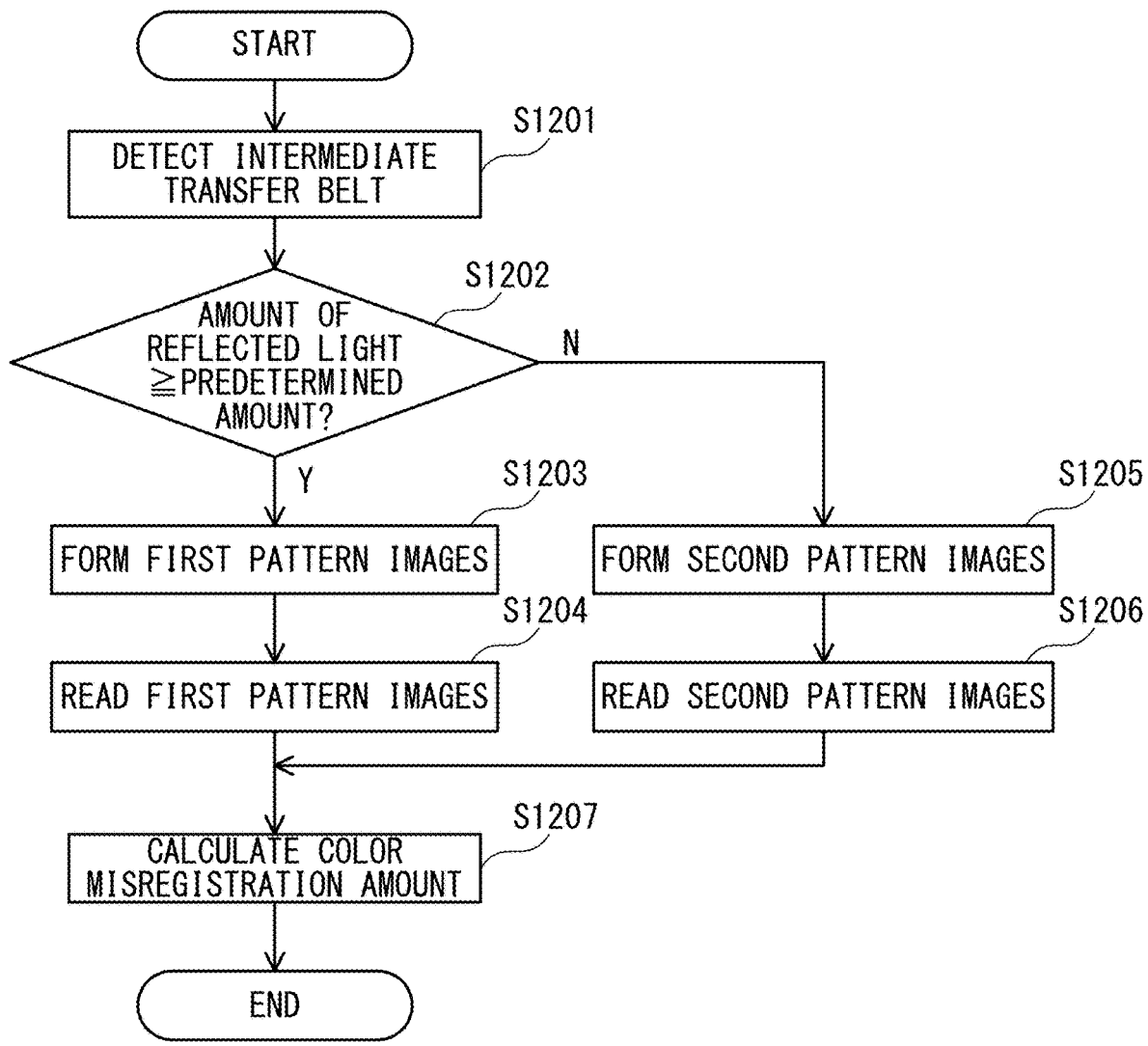
FIG. 13 is a flow chart for illustrating color misregistration detection processing.

FIG. 13 is a flow chart for illustrating processing of detecting the color misregistration amounts in the first embodiment.

The CPU 109 first detects the amount of light reflected on the front surface of the intermediate transfer belt 5 by the optical sensor 7 (Step S1201). The CPU 109 causes the first LED 701 to emit light. An image is not formed on the intermediate transfer belt 5 at this time, and hence the light from the first LED 701 irradiates the front surface of the intermediate transfer belt 5. The first PD 711 receives the specularly reflected light from the front surface of the intermediate transfer belt 5 to output an analog signal corresponding to the amount of specularly reflected light. The CPU 109 acquires the analog signal from the first PD 711 to detect the amount of light reflected by the front surface of the intermediate transfer belt 5.

The CPU 109 determines whether the acquired amount of light reflected by the front surface of the intermediate transfer belt 5 is the predetermined amount or more (Step S1202). Through this processing, the CPU 109 determines whether the gloss of the front surface of the intermediate transfer belt 5 is high.

When the amount of light reflected by the front surface of the intermediate transfer belt 5 is the predetermined amount or more (Step S1202: Y), the CPU 109 determines that the gloss of the front surface of the intermediate transfer belt 5 is not reduced. In this case, the CPU 109 detects the color misregistration amount with the use of the first pattern images. In other words, the CPU 109 transfers pattern image data P1 to the image forming controller 101, and controls the image forming controller 101 to form the first pattern images on the intermediate transfer belt 5 (Step S1203). The CPU 109 causes the first LED 701 to emit light, and reads the first pattern images formed on the intermediate transfer belt 5 by the first PD 711 (Step S1204). In Step S1204, the CPU 109 acquires the analog signal output from the first PD 711. The CPU 109 calculates the color misregistration amount from the result of detecting the first pattern images of respective colors of yellow, magenta, cyan, and black (Step S1207).

When the amount of light reflected by the front surface of the intermediate transfer belt 5 is less than the predetermined amount (Step S1202: N), the CPU 109 determines that the gloss of the front surface of the intermediate transfer belt 5 is reduced. In this case, the CPU 109 detects the color misregistration amount with the use of the second pattern images. In other words, the CPU 109 transfers pattern image data P2 to the image forming controller 101, and controls the image forming controller 101 to form the second pattern images on the intermediate transfer belt 5 (Step S1205). The CPU 109 causes the second LED 702 to emit light, and reads the second pattern images formed on the intermediate transfer belt 5 by the first PD 711 (Step S1206). In Step S1206, the CPU 109 acquires the analog signal output from the first PD 711. Then, the CPU 109 causes the processing to proceed to Step S1207. The CPU 109 calculates the color misregistration amount based on the result of detecting the second pattern images of respective colors of yellow, magenta, cyan, and black (Step S1207). After the processing of Step S1207 is complete, the CPU 109 ends the processing of detecting the color misregistration amount.

The CPU 109 stores the calculated color misregistration amount in the memory (not shown). When the image forming apparatus 100 is to form an image on the sheet, the CPU 109 reads the color misregistration amount from the memory, and corrects image forming positions of the images to be formed based on the image data in accordance with the color misregistration amount.

As described above, the CPU 109 uses the pattern images (first pattern images and second pattern images) for the color misregistration detection corresponding to the result of detecting the gloss of the intermediate transfer belt 5 to acquire the color misregistration amount with an optimal combination of a light emitter and a light receiver. Therefore, the CPU 109 can detect an accurate color misregistration amount to perform accurate color misregistration correction.

Image Density Correction

Figure 14:
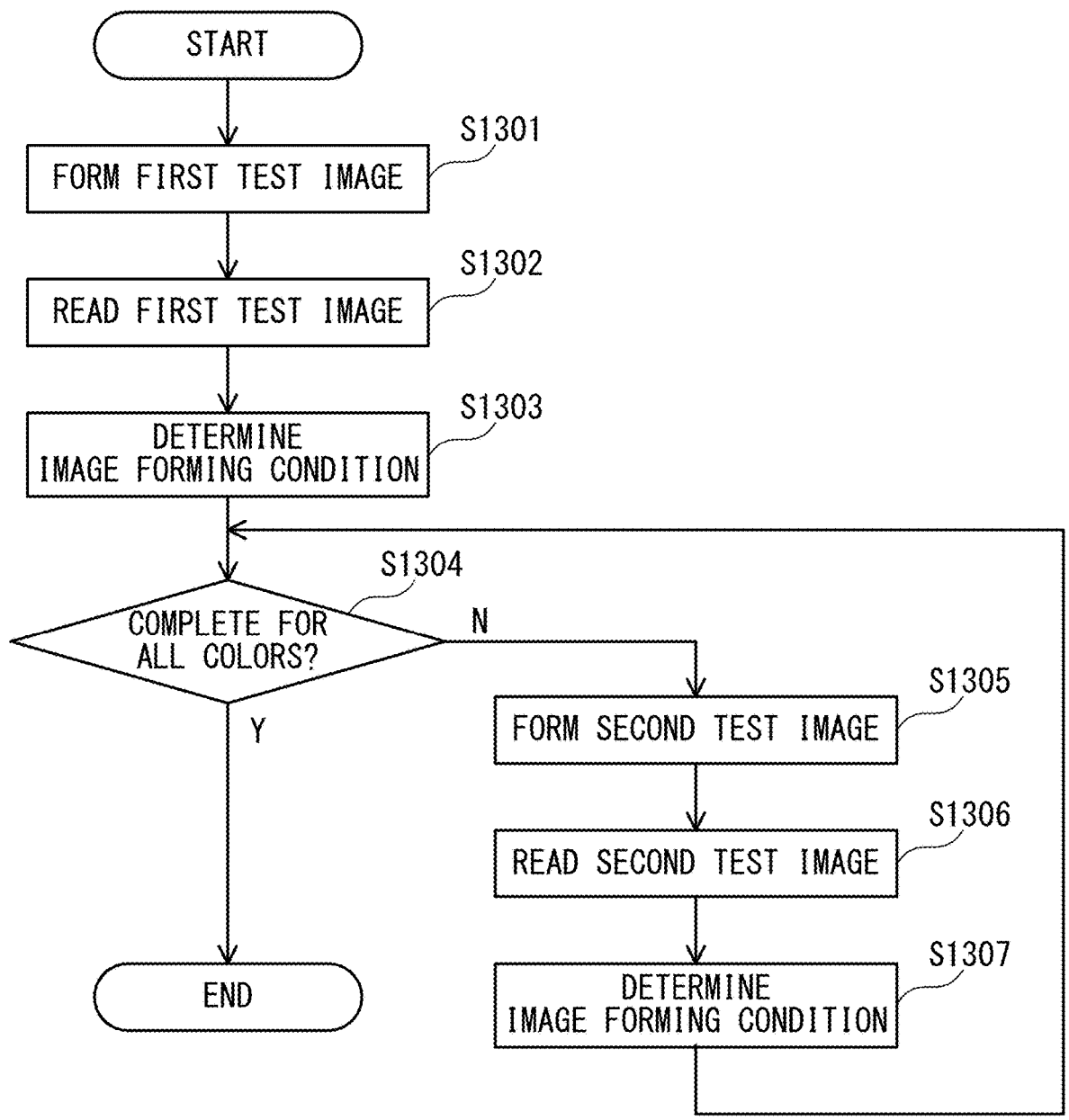
FIG. 14 is a flow chart for illustrating image density detection processing.

FIG. 14 is a flow chart for illustrating image density detection processing in the first embodiment. In the first embodiment, a description is given of a case in which the image density detection for the chromatic colors is performed after the image density detection for black, but the order may be reversed.

The CPU 109 transfers test image data TK to the image forming controller 101, and controls the image forming controller 101 to form the test image of black (first test image) on the intermediate transfer belt 5 (Step S1301). The CPU 109 causes the first LED 701 to emit light, and acquires the analog signal from the first PD 711, which has received the specularly reflected light, to read the test image of black (Step S1302). The CPU 109 converts a level of the analog signal corresponding to the read test image of black into a digital signal value by the A/D converter 110. The CPU 109 determines the image forming condition for the image density based on the digital signal value (Step S1303). In Step S1303, the CPU 109 determines, as the image forming condition regarding the image density for black, a correction amount of an intensity of laser light of the exposure device 15*d*, and stores the correction amount in the memory (not shown). When the black image is to be formed, the CPU 109 reads the correction amount from the memory, and controls the density of the black image to be formed by the image forming unit 10 in accordance with the correction amount.

After calculating the correction amount of the image density for black, the CPU 109 determines whether the image density detection processing has been performed for all colors of yellow, magenta, and cyan (Step S1304).

When the image density detection has not been performed for all colors (Step S1304: N), the CPU 109 first performs the image density detection for yellow. In other words, the CPU 109 transfers test image data TY to the image forming controller 101, and controls the image forming controller 101 to form the test image of yellow (second test image) on the intermediate transfer belt 5 (Step S1305). The CPU 109 causes the first LED 701 to emit light, and acquires the analog signal from the second PD 712, which has received the diffused reflected light, to read the test image of yellow (Step S1306). The CPU 109 converts a level of the analog signal corresponding to the read test image of yellow into a digital signal value by the A/D converter 110. The CPU 109 determines the image forming condition for the image density based on the digital signal value (Step S1307). In Step S1307, the CPU 109 determines, as the image forming condition regarding the image density for yellow, a correction amount of an intensity of laser light of the exposure device 15*a*, and stores the correction amount in the memory (not shown). When the yellow image is to be formed, the CPU 109 reads the correction amount from the memory, and controls the density of the yellow image to be formed by the image forming unit 10 in accordance with the correction amount.

The CPU 109 repeatedly performs the processing of Step S1305 to Step S1307 until the image density detection processing is ended for all colors. When the image density detection processing has been performed for all colors of yellow, magenta, and cyan (Step S1304: Y), the CPU 109 ends the image density detection processing.

As described above, the CPU 109 uses the test image (first test image, second test image) for the image density detection corresponding to the color to be detected to acquire the image density with an optimal combination of a light emitter and a light receiver. Therefore, the CPU 109 can detect a correction amount of an accurate image density to perform accurate image density correction.

As described above, the image forming apparatus 100 according to the first embodiment includes the optical sensor 7 having a plurality of light emitting elements and light receiving elements bonded on the same substrate 201 by die bonding and wire bonding. Therefore, the size and the cost of the optical sensor 7 itself can be reduced. The image forming apparatus 100 uses the optical sensor 7 in both of a specularly reflected light method and a diffused reflected light method. Moreover, the image forming apparatus 100 separately prepares the detection image for use in the specularly reflected light method and the detection image for use in the diffused reflected light method.

In the processing of detecting the color misregistration amount, the image forming apparatus 100 can achieve the detection of the pattern images suitable for the state of the intermediate transfer belt 5 by combining the first LED 701, the second LED 702, and the first PD 711 in an optimal manner. Moreover, in the image density detection processing, the image forming apparatus 100 can achieve the detection of the test image suitable for the color of the test image by combining the first LED 701, the first PD 711, and the second PD 712 in an optimal manner.

In order to maximize the detection ability of the optical sensor 7, it is required to compensate for the positional relationship among the elements with high accuracy. In the optical sensor 7, the first LED 701, the second LED 702, the first PD 711, and the second PD 712 are bonded to the substrate 201 by die bonding and wire bonding, and hence the first LED 701 and the first PD 711 used in the specularly reflected light method are positioned accurately. Meanwhile, positioning among other elements can be performed with a margin. Therefore, an assembly operation of the optical sensor 7 becomes easier than in the related art.

In the processing of detecting the color misregistration amount, the first LED 701 or the second LED 702 and the first PD 711 are combined. In other words, in the processing of detecting the color misregistration amount, the same element (first PD 711) is used on the light receiving side. The position of the light receiving element (first PD 711) is fixed, and hence detection accuracy of the color misregistration amount is increased as compared to the case in which the first pattern images and the second pattern images are detected by different light receiving elements. In the image density detection processing, the first LED 701 and the first PD 711 or the second PD 712 are combined. In other words, in the image density detection processing, the same element (first LED 701) is used on the light emitting side. Therefore, a light emission amount is constant for the case where the test image of black is measured and for a case where a test image of a chromatic color is measured, and detection accuracy of the image density is increased.

Another Configuration Example of Optical Sensor

Figure 15:
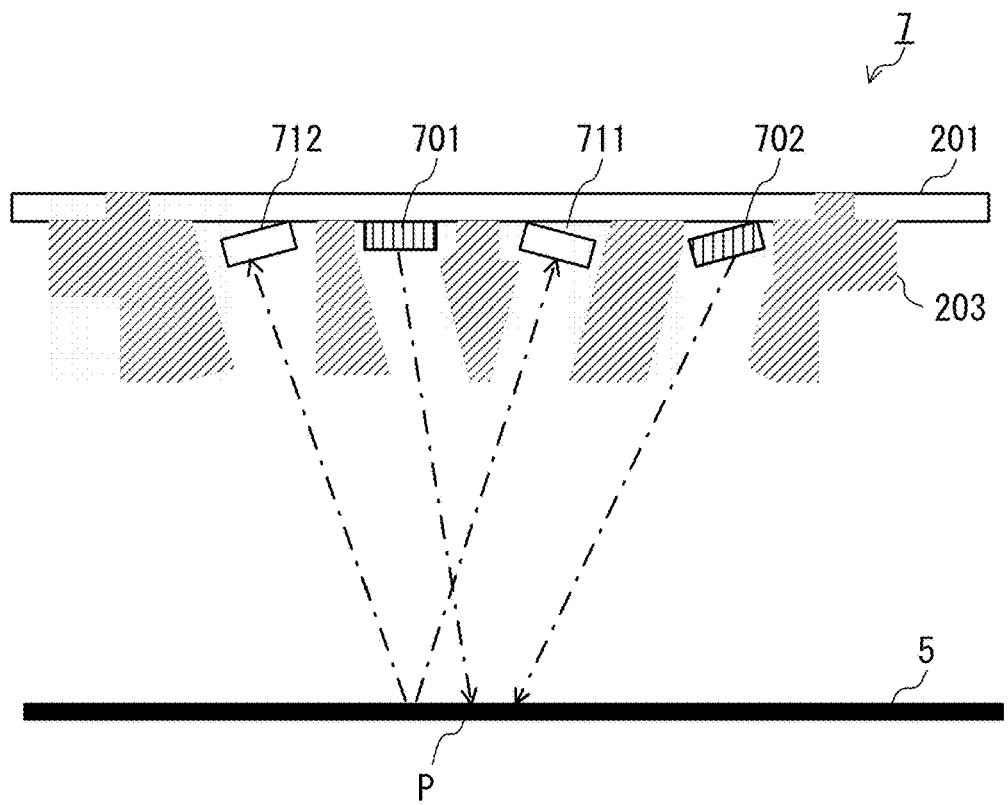
FIG. 15 is a schematic view of a main part of the optical sensor.

In the optical sensor 7 described with reference to FIG. 2, the first LED 701, the second LED 702, the first PD 711, and the second PD 712 are individually bonded to the substrate 201 by die bonding and wire bonding. In this case, there is a fear that mounting accuracy of each part may be reduced. FIG. 15 is an explanatory diagram of the optical sensor 7 in the case where the mounting accuracy of each part is reduced. When the mounting accuracy of each part is reduced, the optical sensor 7 cannot detect the detection image with the optical-axis center point P being the detection position. Therefore, it is preferred to increase the mounting accuracy of the first LED 701, the second LED 702, the first PD 711, and the second PD 712.

Figure 16:
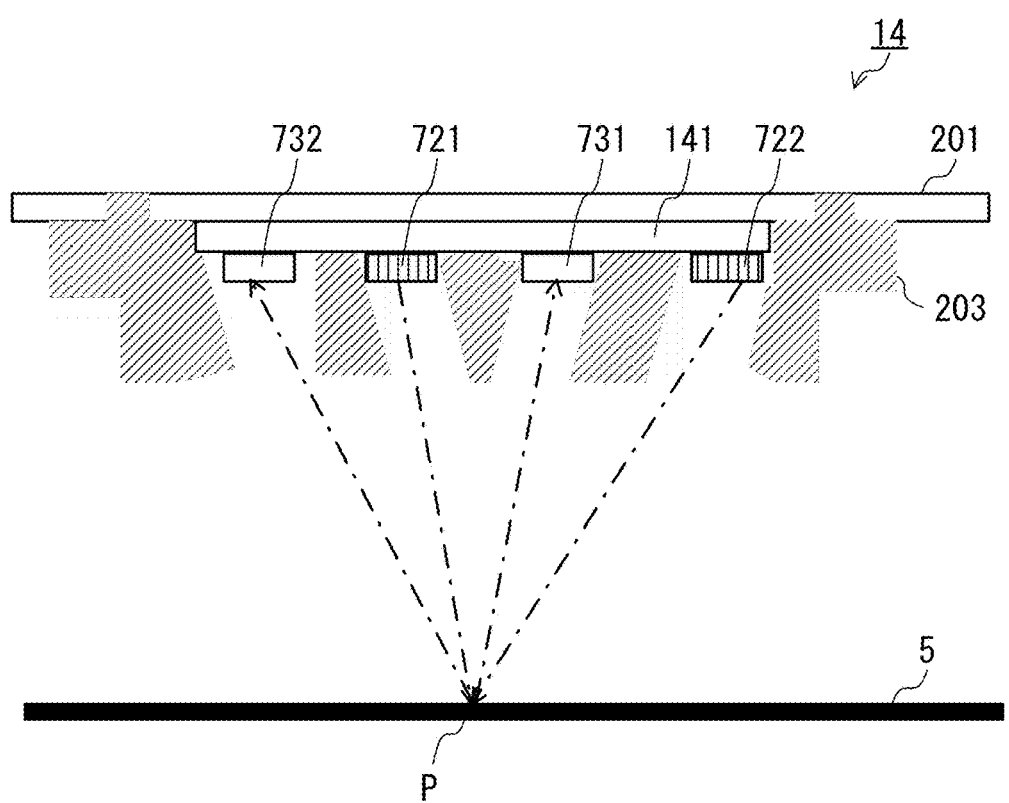
FIG. 16 is a schematic view of a main part of an optical sensor including a semiconductor substrate having formed thereon light emitting elements and light receiving elements.

FIG. 16 is a schematic view of a main part of an optical sensor 14. The optical sensor 14 includes a first LED 721 and a second LED 722 as the light emitting elements, and a first PD 731 and a second PD 732 as the light receiving elements. The first LED 721, the second LED 722, the first PD 731, and the second PD 732 are formed as semiconductor elements on the same semiconductor substrate 141. In the semiconductor substrate 141, the surface on which the first LED 721, the second LED 722, the first PD 731, and the second PD 732 are formed is referred to as a "processing surface". The optical axis of the irradiation light from the first LED 721 and the second LED 722 is orthogonal to the processing surface of the semiconductor substrate 141. Further, the optical axis of reflected light received by the first PD 731 and the second PD 732 is also orthogonal to the processing surface of the semiconductor substrate 141. The semiconductor substrate 141 is fixed on the substrate 201 with the use of an adhesive, for example, an epoxy resin.

The substrate 201 is mounted to the housing 203. The housing 203 has light guide paths for guiding the irradiation light so that light emitted from the first LED 721 and the second LED 722 efficiently irradiate the intermediate transfer belt 5. The housing 203 also has light guide paths for guiding the reflected light so that the first PD 731 and the second PD 732 efficiently receive the reflected light from the intermediate transfer belt 5.

In other words, the light emitted from the first LED 721 travels in the direction of the optical axis (one-dot broken line in FIG. 16), and irradiates the intermediate transfer belt 5, with the light guide path formed in the housing 203. The specularly reflected light from the intermediate transfer belt 5 or the detection image travels in the direction of the optical axis (one-dot broken line in FIG. 16), and reaches the first PD 731. The light emitted from the second LED 722 travels in the direction of the optical axis (one-dot broken line in FIG. 16), and irradiates the intermediate transfer belt 5, with the light guide path in the housing 203. The first PD 731 is configured to receive diffused reflected light of the light with which the second LED 722 has irradiated the intermediate transfer belt 5. The second PD 732 is configured to receive diffused reflected light of the light emitted from the first LED 721 to irradiate the intermediate transfer belt 5.

In the above-mentioned optical sensor 14, the elements are formed on the semiconductor substrate 141, and hence the positional accuracy of each element can be ensured at a high level. In other words, the optical sensor 14 can easily focus the optical axis of each element on the optical-axis center point P. As a result, the detection accuracy of the detection image is increased further than that attained by the optical sensor 7 directly bonded to the substrate.

Moreover, in the optical sensor 14 according to the first embodiment, the light emitter and the light receiver are formed on the semiconductor substrate 141, and hence the distance between the elements can be reduced. As a result, the optical sensor 14 can be downsized as compared to the optical sensor including the bullet elements (FIG. 3A and FIG. 3B). Moreover, according to the optical sensor 14, the distance between the first LED 721 and the first PD 731 can be reduced, and hence the specularly reflected light of the light emitted to the object to be measured can be detected at an acuter angle than that of the optical sensor including the bullet light emitting elements and the bullet light receiving elements. As a result, even when the distance from the optical sensor 14 to the object to be measured is varied, an irradiation area on the object to be measured is hardly varied. When the intermediate transfer belt 5 is rotating, the distance from the optical sensor 14 to the detection image tends to be varied. According to the optical sensor 14 of the first embodiment, even when the distance from the optical sensor 14 to the detection image is varied, the irradiation area is hardly varied, and hence the specularly reflected light from the detection image can be detected with high accuracy. Further, the optical sensor 14 can reduce the distance between the first LED 721 and the first PD 731, and hence design flexibility is also increased. Therefore, according to the optical sensor 14, the first LED 721, the second LED 722, the first PD 731, and the second PD 732 can be arranged in a positional relationship that is suitable for detecting the specularly reflected light and the diffused reflected light from the object to be measured. In particular, in the optical sensor 14 in which the light emitting elements are shared or the light receiving elements are shared, the specularly reflected light and the diffused reflected light from the detection image can be detected more accurately than in the related-art optical sensor including the bullet elements.

Second Embodiment

Overall Configuration

A configuration of an image forming apparatus according to a second embodiment of the present disclosure is the same as the configuration of the image forming apparatus 100 according to the first embodiment exemplified in FIG. 1, and hence a description thereof is omitted.

Optical Sensor

Figure 17:
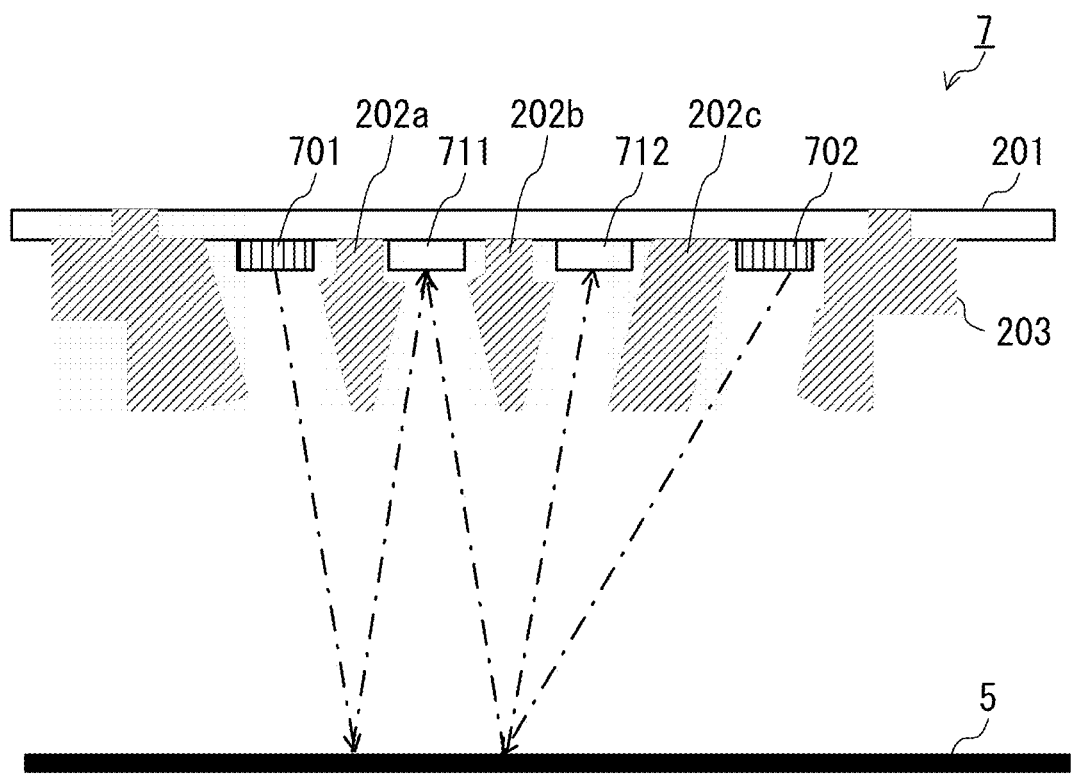
FIG. 17 is a schematic view of a main part of the optical sensor.

FIG. 17 is a schematic view of a main part of the optical sensor 7. The optical sensor 7 according to the second embodiment is different from the optical sensor 7 according to the first embodiment illustrated in FIG. 2 in array of elements. In the optical sensor 7 according to the second embodiment, light emitting elements and light receiving elements are arranged on the substrate 201 in the following order: the first LED 701, the first PD 711, the second PD 712, and the second LED 702. In other words, the first PD 711 and the second PD 712 are located between the first LED 701 and the second LED 702. Further, the optical sensor 7 includes a housing 203, in which light-shielding walls 202a, 202b, and 202c are formed.

A positional relationship between the first LED 701 and the first PD 711 is a positional relationship in which, when the first LED 701 emits light, the first PD 711 can receive specularly reflected light from the object to be measured. In other words, an angle of incidence of the light emitted from the first LED 701 is equal to an angle of reflection of reflected light received by the first PD 711. The angle of incidence of the light from the first LED 701 is 7°, for example, and the angle of reflection of the first PD 711 is 7°, for example.

A positional relationship between the first PD 711 and the second LED 702 is a positional relationship in which, when the second LED 702 emits light, the first PD 711 can receive diffused reflected light from the object to be measured. In other words, an angle of incidence of the light emitted from the second LED 702 is different from an angle of reflection of reflected light received by the first PD 711. The angle of incidence of the light from the second LED 702 is 30°, for example, and the angle of reflection of the first PD 711 is 7°, for example.

A positional relationship between the second LED 702 and the second PD 712 is a positional relationship in which, when the second LED 702 emits light, the second PD 712 can receive other diffused reflected light from the object to be measured. In other words, an angle of incidence of the light emitted from the second LED 702 is different from an angle of reflection of reflected light received by the second PD 712. Further, an angle of reflection of the reflected light received by the first PD 711 is also different from the angle of reflection of the reflected light received by the second PD 712. The angle of incidence of the light from the second LED 702 is 30°, for example, and the angle of reflection of the second PD 712 is −7°, for example.

When the second LED 702 emits light, specularly reflected light from the object to be measured is not received by the first PD 711 or the second PD 712. In other words, in the optical sensor 7, the positional relationship between the second LED 702 and each of the first PD 711 and the second PD 712 is determined such that, even when the light from the second LED 702 is reflected by the object to be measured, the specularly reflected light from the object to be measured is not received by the first PD 711 or the second PD 712.

The substrate 201 is mounted to the housing 203. Under a state in which the substrate 201 is mounted to the housing 203, the light-shielding walls 202a, 202b, and 202c are located among the light emitting elements and the light receiving elements. Specifically, the light-shielding wall 202a is located between the first LED 701 and the first PD 711, the light-shielding wall 202b is located between the first PD 711 and the second PD 712, and the light-shielding wall 202c is located between the second PD 712 and the second LED 702. The light-shielding wall 202a prevents the light emitted from the first LED 701 from being directly received by the first PD 711 and the second PD 712. The light-shielding wall 202c prevents the light emitted from the second LED 702 from being directly received by the second PD 712 and the first PD 711. The light-shielding wall 202b prevents light diffused by the first PD 711 from being received by the second PD 712, and prevents light diffused by the second PD 712 from being received by the first PD 711. The housing 203, and the light-shielding wall 202a and the light-shielding wall 202c guide the irradiation light so that the intermediate transfer belt 5 is irradiated efficiently with the light emitted from the first LED 701 and the second LED 702. The light-shielding walls 202a, 202b, and 202c function as guides for reflected light from the intermediate transfer belt 5 to be efficiently received by the first PD 711 and the second PD 712.

Similarly to the optical sensor 7 of the first embodiment, the first LED 701, the second LED 702, the first PD 711, and the second PD 712 are mounted on the same substrate 201, and hence the elements can be mounted substantially in parallel to the intermediate transfer belt 5. As a result, in the optical sensor 7, the shift of the optical axis can be reduced as compared to the optical sensor including bullet elements with lead pins, for example. Further, the first LED 701, the second LED 702, the first PD 711, and the second PD 712 are elements bonded to the substrate 201 by die bonding and wire bonding, and hence can be reduced in element interval as compared to the bullet elements. Therefore, the entire size of the optical sensor 7 can be reduced.

The elements included in the optical sensor 7 according to the second embodiment are arrayed on the substrate 201 in the following order: the first LED 701, the first PD 711, the second PD 712, and the second LED 702. In other words, a plurality of light emitting elements and a plurality of light receiving elements are arrayed so as not to sandwich one light receiving element between two light emitting elements. The reason of such array is described.

Figure 18A:
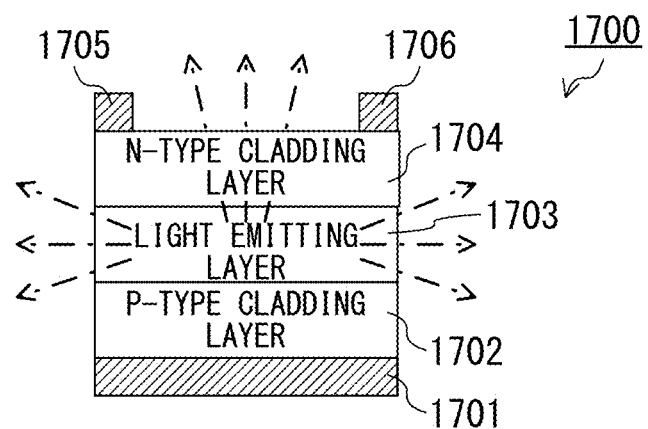
FIG. 18A and FIG. 18B are explanatory diagrams of an LED.
Figure 18B:
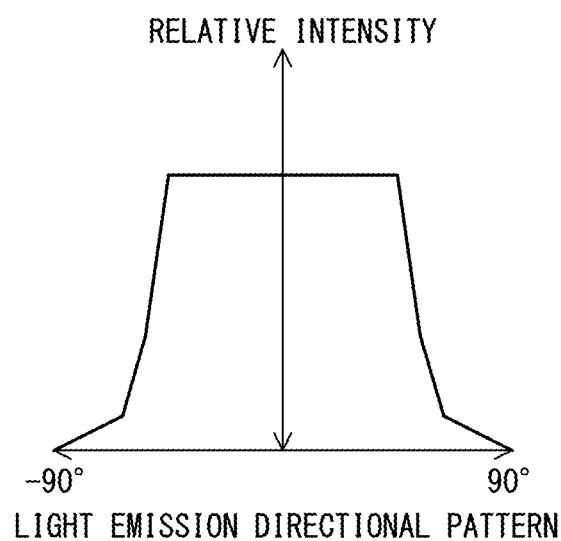

FIG. 18A and FIG. 18B are explanatory diagrams of an LED used for the light emitting elements (first LED 701 and second LED 702) in the second embodiment. As illustrated in FIG. 18A, an LED 1700 has a double heterostructure in which a p-type cladding layer 1702, a light emitting layer 1703, and an n-type cladding layer 1704 are laminated on an electrode 1701. On the n-type cladding layer 1704, electrodes 1705 and 1706 are provided. With the LED 1700 having the double heterostructure, the light emitting layer 1703 outputs light in all directions. In FIG. 18B, a light emission directional pattern of the LED 1700 is exemplified. As exemplified in FIG. 18B, the LED 1700 outputs light also in edge-on directions of 90° and −90°, for example.

Figure 19:
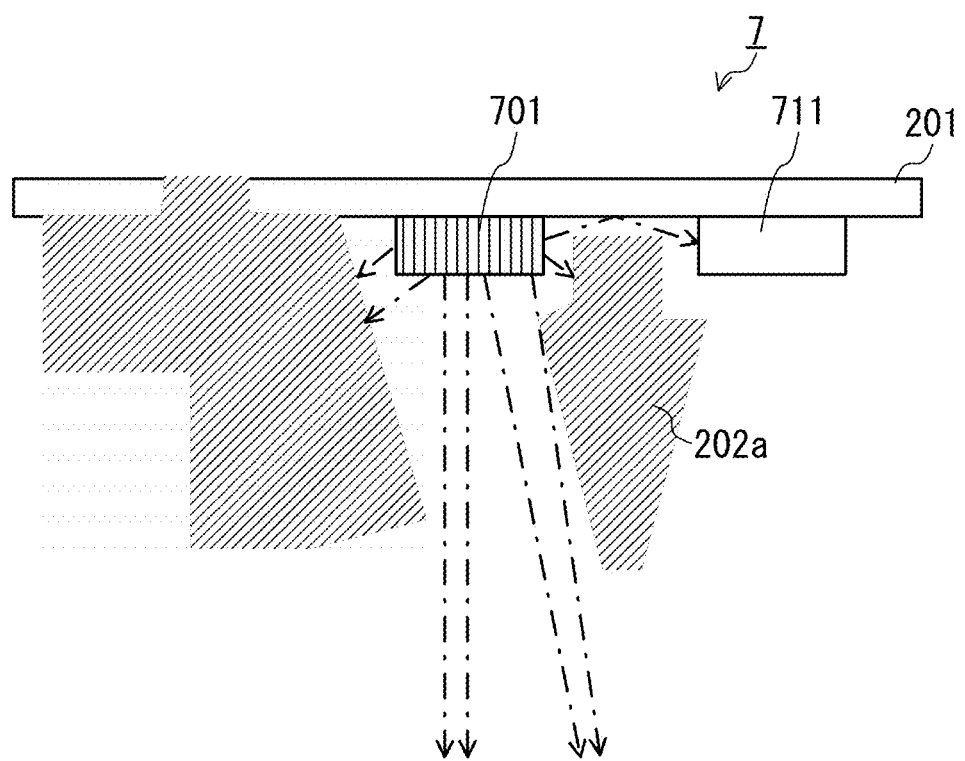
FIG. 19 is an enlarged view of a periphery of a first LED and a first PD.

FIG. 19 is an enlarged view of a periphery of the first LED 701 and the first PD 711 of the optical sensor 7. Between the first LED 701 and the first PD 711, the light-shielding wall 202a configured to prevent the light emitted from the first LED 701 from directly reaching the first PD 711 is provided. However, when temperatures of the substrate 201 and the housing 203 are increased by the first LED 701 continuously emitting light, for example, a gap may be formed between the light-shielding wall 202a, which is formed in the housing 203, and the substrate 201.

As described above, the first PD 711 is arranged so as to receive the specularly reflected light from the object to be measured when the first LED 701 emits light. When the gap is formed between the light-shielding wall 202a and the substrate 201, the first PD 711 receives, in addition to the specularly reflected light from the object to be measured, stray light leaking out of the gap as illustrated in FIG. 19. In this case, the first PD 711 cannot detect the specularly reflected light from the object to be measured with high accuracy. In other words, with the first PD 711 receiving the stray light leaking out of the gap between the light-shielding wall 202a and the substrate 201, accurate color misregistration detection and image density detection are hindered.

The second PD 712 is arranged so as to receive diffused reflected light from the object to be measured when the second LED 702 emits light. In addition, between the second LED 702 and the second PD 712, the light-shielding wall 202c configured to prevent the light emitted from the second LED 702 from directly reaching the second PD 712 is provided. When a gap is formed between the light-shielding wall 202c, which is formed in the housing 203, and the substrate 201 due to increased temperatures of the substrate 201 and the housing 203, the second PD 712 receives, in addition to the diffused reflected light from the object to be measured, stray light leaking out of the gap. In this case, the second PD 712 cannot detect the diffused reflected light from the object to be measured with high accuracy. In other words, with the second PD 712 receiving the stray light leaking out of the gap between the light-shielding wall 202c and the substrate 201, accurate color misregistration detection and image density detection are hindered.

Figure 20:
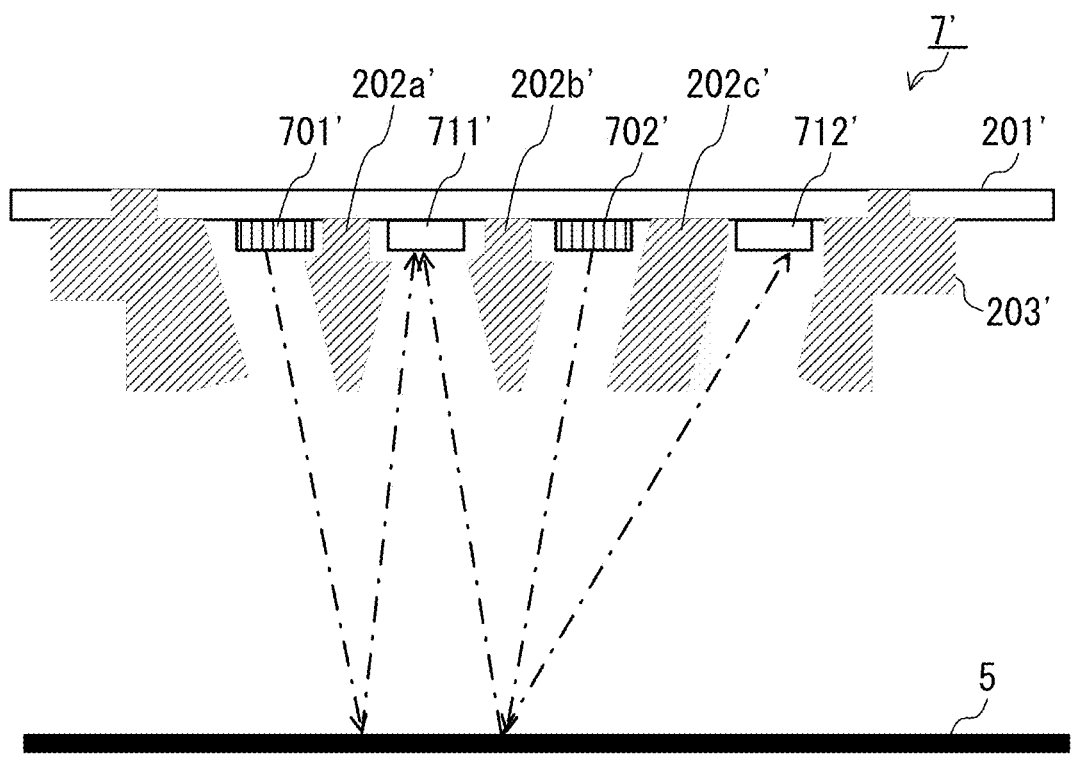
FIG. 20 is a comparative view for illustrating an example of an optical sensor in which gaps are easily formed in light-shielding walls.

In FIG. 20, a comparative example of an optical sensor 7', in which a gap is easily formed in the light-shielding walls, is illustrated. Arrangement of elements of the optical sensor 7' is different from the arrangement of the elements of the optical sensor 7 of FIG. 17. In the optical sensor 7' illustrated in FIG. 20, elements are arrayed on a substrate 201' in the following order: a first LED 701', a first PD 711', a second LED 702', and a second PD 712'. Further, the optical sensor 7' illustrated in FIG. 20 has a light-shielding wall 202a' between the first LED 701' and the first PD 711', a light-shielding wall 202b' between the first PD 711' and the second LED 702', and a light-shielding wall 202c' between the second LED 702' and the second PD 712'. In the case of this array, temperatures of the first PD 711' and its surroundings are increased not only when the first LED 701' emits light but also when the second LED 702' emits light. In other words, in the optical sensor 7', a distance between the first LED 701' and the second LED 702', which correspond to two heat sources, is shorter than in the optical sensor 7 illustrated in FIG. 17, and hence a temperature of a region between those heat sources tends to be increased. Therefore, a gap is easily formed between the substrate 201' and the light-shielding wall 202a', and further, a gap is easily formed between the substrate 201' and the light-shielding wall 202b'. As a result, in the optical sensor 7' illustrated in FIG. 20, the gaps out of which stray light leaks are easily formed in the light-shielding walls 202a' and 202b', and the first PD 711' cannot detect reflected light from the detection image with high accuracy.

Moreover, the first PD 711' is affected by the stray light leaking out of the gaps in the light-shielding walls 202a' and 202b' both when the first LED 701' emits light and when the second LED 702' emits light. Therefore, with the optical sensor 7' illustrated in FIG. 20, the first PD 711' cannot detect the reflected light from the detection image with high accuracy also when the second LED 702' emits light. Further, when the temperature around the second LED 702' is increased, stray light may leak out of the gaps in the light-shielding wall 202b' and the light-shielding wall 202c'. When the stray light leaks out of the gaps in the light-shielding wall 202b' and the light-shielding wall 202c', both of the first PD 711' and the second PD 712' cannot detect reflected light from the detection image with high accuracy.

In order to prevent the gap from being formed between the substrate 201 and each of the light-shielding walls 202a, 202b, and 202c, in the optical sensor 7 according to the second embodiment illustrated in FIG. 17, the elements are arrayed on the substrate 201 in the following order: the first LED 701, the first PD 711, the second PD 712, and the second LED 702. In other words, with the optical sensor 7 (FIG. 17), the distance from the first LED 701 to the second LED 702 can be made farther than in the optical sensor 7' illustrated in FIG. 20 without increasing the size. As a result, even when the first LED 701 and the second LED 702 emit light, the temperature of the region between the first LED 701 and the second LED 702 is less likely to be increased. Specifically, in the optical sensor 7 (FIG. 17), the distance from the light-shielding wall 202c to the first LED 701 is longer than in the optical sensor 7' illustrated in FIG. 20, and hence the gap is less likely be formed between the light-shielding wall 202c and the substrate 201 even when the first LED 701 emits light. Similarly, in the optical sensor 7 (FIG. 17), the distance from the light-shielding wall 202a to the second LED 702 is longer than in the optical sensor 7' illustrated in FIG. 20, and hence the gap is less likely to be formed between the light-shielding wall 202a and the substrate 201 even when the second LED 702 emits light. Therefore, according to the optical sensor 7 illustrated in FIG. 17, the stray light, which causes the reduction in detection accuracy of the optical sensor 7, can be prevented from being generated. Further, according to the optical sensor 7, with the stray light being prevented from being generated, the reflected light from the detection image can be detected with high accuracy.

Controller

A configuration of a controller configured to control an operation of the image forming apparatus 100 according to the second embodiment is the same as the configuration of the controller of the image forming apparatus 100 according to the first embodiment exemplified in FIG. 4, and hence a description thereof is omitted.

Color Misregistration Correction and Image Density Correction

The image forming apparatus 100 according to the second embodiment can also perform color misregistration correction processing (FIG. 13) and image density correction processing (FIG. 14) with the use of pattern images (FIG. 5, FIG. 7A and FIG. 7B) and a test image (FIG. 10A, FIG. 10B) similar to those of the image forming apparatus 100 according to the first embodiment.

The image forming apparatus 100 according to the second embodiment provides actions and effects similar to those of the first embodiment. Further, the image forming apparatus 100 according to the second embodiment can suppress the effect of the stray light accompanying the increase in temperature and detect the reflected light from the detection image with high accuracy with the characteristic array of the elements in the optical sensor 7. Therefore, color misregistration correction and image density correction with higher accuracy than in the related art are achieved.

Other Configuration Example 1 of Optical Sensor

As with the optical sensor 7 according to the first embodiment described with reference to FIG. 2, it is preferred that the optical sensor 7 according to the second embodiment of FIG. 17 be increased in mounting accuracy of the first LED 701, the second LED 702, the first PD 711, and the second PD 712.

Figure 21:
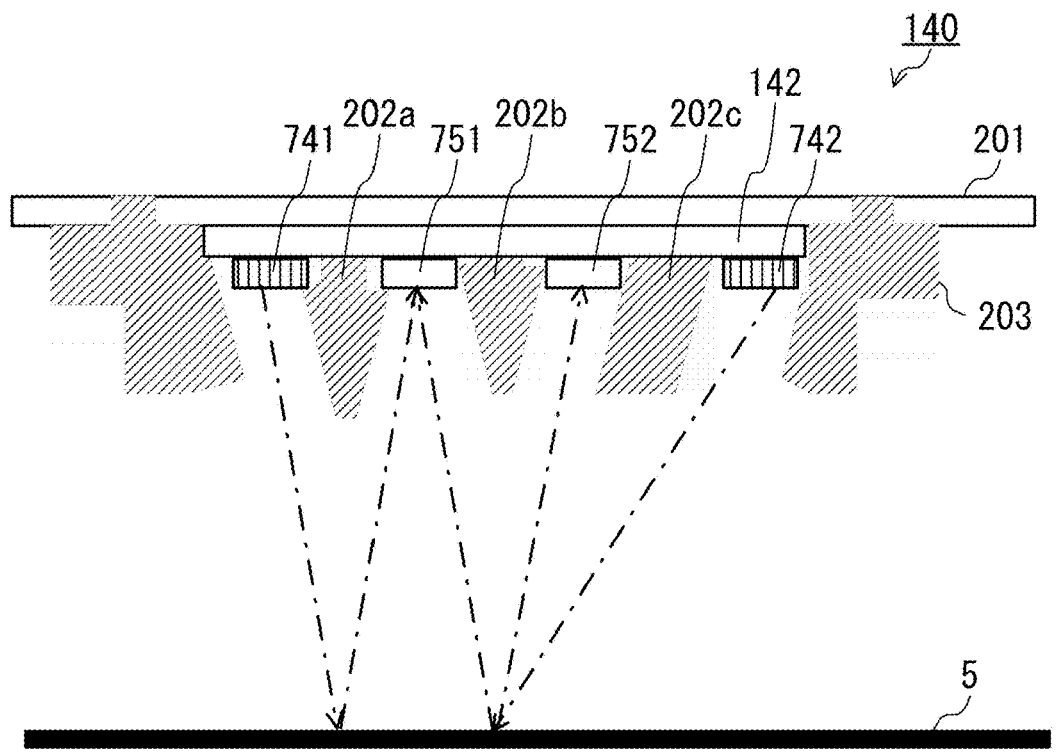
FIG. 21 is a schematic view of a main part of an optical sensor including a semiconductor substrate having formed thereon light emitting elements and light receiving elements.

FIG. 21 is a schematic view of a main part of an optical sensor 140 including a semiconductor substrate having formed thereon light emitting elements and light receiving elements. The optical sensor 140 includes a first LED 741 and a second LED 742 as the light emitting elements, and a first PD 751 and a second PD 752 as the light receiving elements. The first LED 741, the second LED 742, the first PD 751, and the second PD 752 are formed as semiconductor elements on the same semiconductor substrate 142. In the semiconductor substrate 142, the surface on which the first LED 741, the second LED 742, the first PD 751, and the second PD 752 are formed is referred to as a "processing surface". The optical axis of the irradiation light from the first LED 741 and the second LED 742 is orthogonal to the processing surface of the semiconductor substrate 142. Further, the optical axis of reflected light received by the first PD 751 and the second PD 752 is also orthogonal to the processing surface of the semiconductor substrate 142. The semiconductor substrate 142 is fixed on the substrate 201 with the use of an adhesive, for example, an epoxy resin.

The substrate 201 is mounted to the housing 203. The housing 203 has light guide paths for guiding the irradiation light so that light emitted from the first LED 741 and the second LED 742 efficiently irradiate the intermediate transfer belt 5. The housing 203 also has light guide paths for guiding the reflected light so that the first PD 751 and the second PD 752 efficiently receive the reflected light from the intermediate transfer belt 5.

In other words, the light emitted from the first LED 741 travels in the direction of the optical axis (one-dot broken line in FIG. 21), and irradiates the intermediate transfer belt 5, with the light guide path formed in the housing 203. The specularly reflected light from the intermediate transfer belt 5 or the detection image travels in the direction of the optical axis (one-dot broken line in FIG. 21), and reaches the first PD 751. The light emitted from the second LED 742 travels in the direction of the optical axis (one-dot broken line in FIG. 21), and irradiates the intermediate transfer belt 5, with the light guide path in the housing 203. The first PD 751 and the second PD 752 are configured to receive diffused reflected light of the light emitted from the second LED 742 to irradiate the intermediate transfer belt 5.

In the above-mentioned optical sensor 140, the elements are formed on the semiconductor substrate 142, and hence the positional accuracy of each element can be ensured at high level. In other words, the optical sensor 140 can easily focus the optical axis of each element on the optical-axis center point P. As a result, the accuracy of detecting the detection image is increased further than that of the optical sensor 7 including the elements bonded to the substrate by die bonding and wire bonding.

Other Configuration Example 2 of Optical Sensor

In the optical sensor 7 of FIG. 17 described above, the two light receiving elements are arranged between the two light emitting elements, and hence the gap is prevented from being formed between the substrate and each of the light-shielding walls located between the light emitting elements and the light receiving elements due to the heat from the light emitting elements. Now, as a modification example of the optical sensor 7, an optical sensor 210 of FIG. 22, in which two light emitting elements are arranged between two light receiving elements, is described.

Moreover, in the optical sensor 7 according to the second embodiment, the light-shielding walls 202a, 202b, and 202c are formed in the housing 203. However, the present disclosure is also applicable to a case in which the light-shielding walls 202a, 202b, and 202c are members different from the housing 203. In other words, even when the light-shielding walls 202a, 202b, and 202c are members different from the housing 203, through arrangement of a plurality of light receiving elements between a light emitting element and another light emitting element, a gap can be prevented from being formed between the housing 203 and each of the light-shielding walls 202a, 202b, and 202c.

Figure 22:
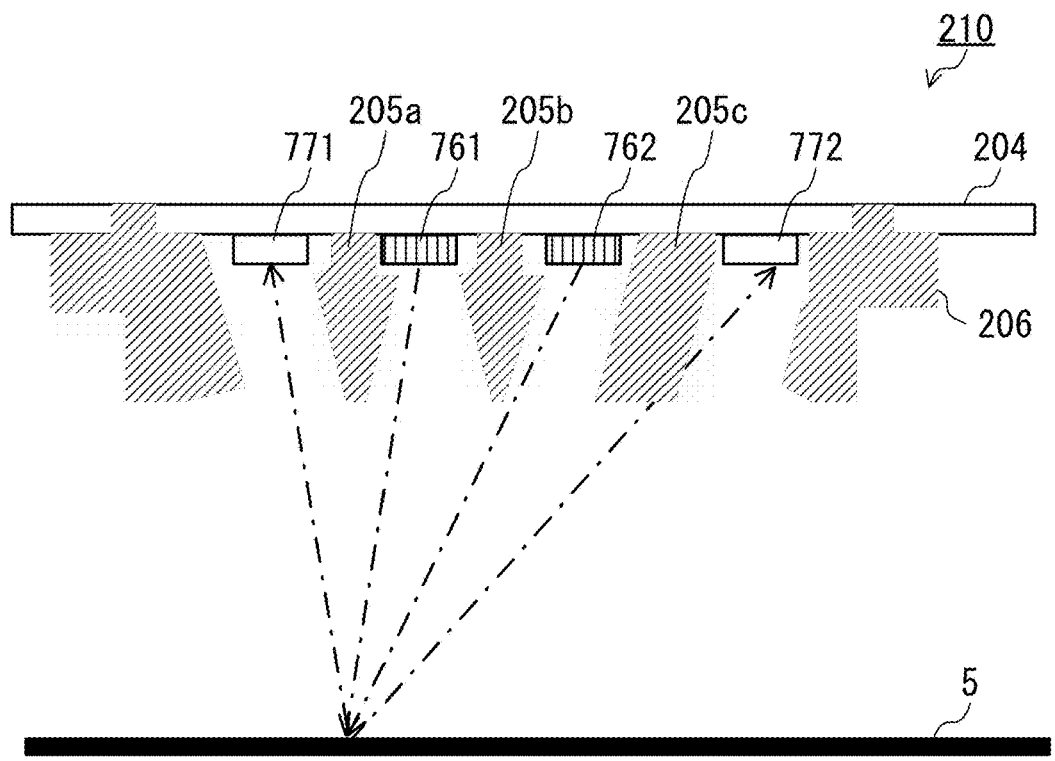
FIG. 22 is a cross-sectional view of a main part of an optical sensor.

FIG. 22 is a cross-sectional view of a main part of the optical sensor 210 as another embodiment that is different from the optical sensor 7. The optical sensor 210 includes a first LED 761, a second LED 762, a first PD 771, and a second PD 772, a substrate 204 having those elements mounted thereon, and a housing 206 having the substrate 204 mounted thereto. Moreover, in the optical sensor 210, the elements are arranged on the substrate 204 in the following order: the first PD 771, the first LED 761, the second LED 762, and the second PD 772. In other words, in the optical sensor 210, the first LED 761 and the second LED 762 are located between the first PD 771 and the second PD 772. The first LED 761, the second LED 762, the first PD 771, and the second PD 772 are parts bonded to the substrate 204 by die bonding and wire bonding.

In the housing 206 of the optical sensor 210, light-shielding walls 205a, 205b, and 205c are formed. The light-shielding wall 205a is located between the first PD 771 and the first LED 761. The light-shielding wall 205a prevents light emitted from the first LED 761 from being directly received by the first PD 771. The light-shielding wall 205b is located between the first LED 761 and the second LED 762. The light-shielding wall 205a and the light-shielding wall 205b guide the irradiation light of the first LED 761 so that the intermediate transfer belt 5 is efficiently irradiated with the light emitted from the first LED 761. The light-shielding wall 205c prevents light emitted from the second LED 762 from being directly received by the second PD 772. Further, the light-shielding wall 205b and the light-shielding wall 205c guide the irradiation light of the second LED 762 so that the intermediate transfer belt 5 is efficiently irradiated with the light emitted from the second LED 762.

Subsequently, the arrangement of the elements is described. A positional relationship between the first LED 761 and the first PD 771 is a positional relationship in which, when the first LED 761 emits light, the first PD 771 can receive specularly reflected light from the object to be measured. In other words, an angle of incidence of the light emitted from the first LED 761 is equal to an angle of reflection of reflected light received by the first PD 771. The angle of incidence of the light from the first LED 761 is 7°, for example, and the angle of reflection of the first PD 771 is 7°, for example.

Further, a positional relationship between the first PD 771 and the second LED 762 is a positional relationship in which, when the second LED 762 emits light, the first PD 771 can receive diffused reflected light from the object to be measured. In other words, an angle of incidence of the light emitted from the second LED 762 is different from an angle of reflection of reflected light received by the first PD 771. The angle of incidence of the light from the second LED 762 is 30°, for example, and the angle of reflection of the first PD 771 is 7°, for example. A positional relationship between the second LED 762 and the second PD 772 is a positional relationship in which, when the second LED 762 emits light, the second PD 772 can receive other diffused reflected light from the object to be measured. In other words, an angle of incidence of the light emitted from the second LED 762 is different from an angle of reflection of reflected light received by the second PD 772. Further, an angle of reflection of the reflected light received by the first PD 771 is also different from the angle of reflection of the reflected light received by the second PD 772. The angle of incidence of the light from the second LED 762 is 30°, for example, and the angle of reflection of the second PD 772 is −60°, for example.

When the second LED 762 emits light, specularly reflected light from the object to be measured is not received by the first PD 771 or the second PD 772. In other words, in the optical sensor 210, the positional relationship between the second LED 762 and each of the first PD 771 and the second PD 772 is determined such that, even when the light from the second LED 762 is reflected by the object to be measured, the specularly reflected light from the object to be measured is not received by the first PD 771 or the second PD 772.

In the optical sensor 210, the first LED 761 and the second LED 762 are arranged between the first PD 771 and the second PD 772. In other words, in the optical sensor 210, the second LED 762 is located on a side opposite to the first PD 771 with respect to the first LED 761. Therefore, even when the first LED 761 and the second LED 762 emit light, a temperature around the first PD 771 and the light-shielding wall 205a is less likely to be increased. Therefore, in the optical sensor 210, even when the second LED 762 emits light, a gap is less likely to be formed between the light-shielding wall 205a, which is located between the first PD 771 and the first LED 761, and the substrate 204. Further, the first LED 761 is located on a side opposite to the second PD 772 with respect to the second LED 762. Therefore, even when the first LED 761 and the second LED 762 emit light, a temperature around the second PD 772 and the light-shielding wall 205c is less likely to be increased. Therefore, in the optical sensor 210, even when the first LED 761 emits light, a gap is less likely to be formed between the light-shielding wall 205c, which is located between the second PD 772 and the second LED 762, and the substrate 204.

Therefore, in the optical sensor 210, in which the first LED 761 and the second LED 762 are located between the first PD 771 and the second PD 772, the gap is less likely to be formed between the light-shielding wall 205a and the substrate 204, or between the light-shielding wall 205c and the substrate 204 even when the first LED 761 and the second LED 762 emit light. As a result, according to the optical sensor 210, the stray light, which causes the reduction in detection accuracy of the optical sensor 210, can be prevented from being generated.

The first LED 761, the second LED 762, the first PD 771, and the second PD 772 are parts mounted on the substrate 204 by die bonding and wire bonding. However, in order to increase the mounting accuracy of the plurality of elements, the optical sensor 210 may adopt a configuration in which the plurality of elements are formed as semiconductor elements on the same semiconductor substrate as with the optical sensor 140 of FIG. 21. When this configuration is adopted, the first LED 761, the second LED 762, the first PD 771, and the second PD 772 are electrically connected to a power supply circuit and a detection circuit through the substrate 204, for example.

In the above-mentioned optical sensor 210, the elements are formed on the semiconductor substrate, and hence the elements can be easily arranged to be substantially parallel to the surface of the intermediate transfer belt 5. With this configuration, the mounting accuracy of the first LED 761, the second LED 762, the first PD 771, and the second PD 772 can be increased as compared to the configuration in which the parts are mounted on the substrate 204 by die bonding and wire bonding.

Moreover, the optical sensor 7, 140, 210 according to the second embodiment may adopt a configuration including lenses in the housing 203, for example. The lenses focus the light emitted from the light emitting elements on the object to be measured, and focus the reflected light from the object to be measured on the light receiving elements. With this configuration, the reflected light can be detected efficiently.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-152594, filed Aug. 14, 2018, and Japanese Patent Application No. 2018-152595, filed Aug. 14, 2018, which are hereby incorporated by reference herein in their entirety.

What is claimed is:

1. An optical sensor comprising:
   a substrate;
   a first light emitting element formed on a predetermined surface of the substrate;
   a second light emitting element formed on the predetermined surface;
   a first light receiving element, formed on the predetermined surface; and
   a second light receiving element formed on the predetermined surface,
   wherein light emitted from the first light emitting element is irradiated on an object to be measured at a position, the predetermined surface facing the position,
   wherein light emitted from the second light emitting element is irradiated on the object to be measured at a position, the predetermined surface facing the position,
   wherein, in a case in which the first light emitting element emits light, light specularly reflected from the object to be measured is receivable by the first light receiving element,
   wherein, in a case in which the second light emitting element emits light, light diffusely reflected from the object to be measured is receivable by the second light receiving element,
   wherein the first light emitting element, the first light receiving element, the second light receiving element, and the second light emitting element are arranged in a predetermined direction, and
   wherein the first light receiving element and the second light receiving element are arranged between the first light emitting element and the second light emitting element.

2. The optical sensor according to claim 1, wherein
   the substrate includes a semiconductor substrate; and
   the optical sensor further comprises a printed circuit board on which the semiconductor substrate is fixed.

3. The optical sensor according to claim 1, wherein, in a case in which the second light emitting element emits light, light diffusely reflected from the object to be measured is receivable by the first light receiving element.

4. The optical sensor according to claim 1, further comprising:
   a housing having a lens through which light emitted from the first light emitting element passes and light emitted from the second light emitting element passes, wherein an incident angle of the light emitted from the first light emitting element to the object to be measured is less than an incident angle of the light emitted from the second light emitting element to the object to be measured.

5. The optical sensor according to claim 1, further comprising:
a housing having a lens through which light emitted from the first light emitting element passes and light emitted from the second light emitting element passes,
wherein an angle formed by an optical axis of the light, passing through the lens, emitted from the first light emitting element and a virtual line orthogonal to the predetermined surface is less than an angle formed by an optical axis of the light, passing through the lens, emitted from the second light emitting element and the virtual line orthogonal to the predetermined surface.

6. The optical sensor according to claim 1, further comprising:
a housing having a lens through which the light reflected from the object to be measured passes,
wherein a reflection angle of the light reflected from the object to be measured which is received by the second light receiving element via the lens is less than 0°.

7. The optical sensor according to claim 1, further comprising:
a first wall portion arranged between the first light emitting element and the first light receiving element in the predetermined direction to prevent the first light receiving element from receiving light from the first light emitting element; and
a second wall portion arranged between the second light emitting element and the second light receiving element in the predetermined direction to prevent the second light receiving element from receiving light from the second light emitting element.

8. The optical sensor according to claim 1, further comprising:
a first wall portion arranged between the first light emitting element and the first light receiving element in the predetermined direction to prevent the first light receiving element from receiving light from the first light emitting element;
a second wall portion arranged between the first light receiving element and the second light receiving element in the predetermined direction; and
a third wall portion arranged between the second light emitting element and the second light receiving element in the predetermined direction to prevent the second light receiving element from receiving light from the second light emitting element.

9. The optical sensor according to claim 1, wherein the object to be measured is an unfixed image formed by using toner.

10. An image forming apparatus that forms an image on a sheet based on an image forming condition, the image forming apparatus comprising:
an image forming unit configured to form a measurement image on an image bearing member;
a sensor configured to measure reflected light from the measurement image on the image bearing member; and
a controller configured to generate the image forming condition based on a measurement result by the sensor,
wherein the sensor includes:
a substrate;
a first light emitting element formed on a predetermined surface of the substrate;
a second light emitting element formed on the predetermined surface;
a first light receiving element formed on the predetermined surface; and
a second light receiving element formed on the predetermined surface,
wherein light emitted from the first light emitting element is irradiated on the measurement image at a position, the predetermined surface facing the position,
wherein light emitted from the second light emitting element is irradiated on the measurement image at a position, the predetermined surface facing the position,
wherein, in a case in which the first light emitting element emits light, light specularly reflected from the measurement image is receivable by the first light receiving element,
wherein, in a case in which the second light emitting element emits light, light diffusely reflected from the measurement image is receivable by the second light receiving element,
wherein the first light emitting element, the first light receiving element, the second light receiving element, and the second light emitting element are arranged in a predetermined direction, and
wherein the first light receiving element and the second light receiving element are arranged between the first light emitting element and the second light emitting element.

11. The image forming apparatus according to claim 10, wherein
the substrate includes a semiconductor substrate; and
the sensor further includes a printed circuit board on which the semiconductor substrate is fixed.

12. The image forming apparatus according to claim 10, wherein
the image forming unit includes a first image forming unit configured to develop a black image and a second image forming unit configured to develop a color image;
the measurement image includes a first measurement image formed by the first image forming unit and a second measurement image formed by the second image forming unit;
the controller controls the first light emitting element to emit light, controls the first light receiving element to receive reflected light from the first measurement image, and generates a first image forming condition, which is used to adjust a density of a black image to be formed by the first image forming unit, based on a result of measuring the reflected light from the first measurement image; and
the controller controls the second light emitting element to emit light, controls the second light receiving element to receive reflected light from the second measurement image, and generates a second image forming condition, which is used to adjust a density of a color image to be formed by the second image forming unit, based on a result of measuring the reflected light from the second measurement image.

13. The image forming apparatus according to claim 12, wherein
the measurement image includes a third measurement image formed by the first image forming unit and the second image forming unit; and
the controller controls the second light emitting element to emit light, controls the first light receiving element to receive reflected light from the third measurement image, and generates a third image forming condition, which is used to adjust a relative position between a black image to be formed by the first image forming unit and a color image to be formed by the second image forming unit, based on a result of measuring the reflected light from the third measurement image.

14. The image forming apparatus according to claim 12, wherein the measurement image includes a third measurement image formed by the first image forming unit and the second image forming unit; and the controller controls the first light emitting element to emit light, controls the first light receiving element to receive reflected light from the third measurement image, and generates a third image forming condition, which is used to adjust a relative position between a black image to be formed by the first image forming unit and a color image to be formed by the second image forming unit, based on a result of measuring the reflected light from the third measurement image.

15. The image forming apparatus according to claim 10, wherein, in a case in which the second light emitting element emits light, light diffusely reflected from the measurement image is receivable by the first light receiving element.

16. The image forming apparatus according to claim 10, further comprising:

a housing having a lens through which light emitted from the first light emitting element passes and light emitted from the second light emitting element passes, wherein an incident angle of the light emitted from the first light emitting element to the measurement image is less than an incident angle of the light emitted from the second light emitting element to the measurement image.

17. The image forming apparatus according to claim 10, further comprising:

a housing having a lens through which light emitted from the first light emitting element passes and light emitted from the second light emitting element passes, wherein an angle formed by an optical axis of the light, passing through the lens, emitted from the first light emitting element and a virtual line orthogonal to the predetermined surface is less than an angle formed by an optical axis of the light, passing through the lens, emitted from the second light emitting element and the virtual line orthogonal to the predetermined surface.

18. The image forming apparatus according to claim 10, further comprising:

a housing having a lens through which the light reflected from the measurement image passes, wherein a reflection angle of the light reflected from the measurement image which is received by the second light receiving element via the lens is less than 0°.

19. The image forming apparatus according to claim 10, further comprising:

a first wall portion arranged between the first light emitting element and the first light receiving element in the predetermined direction to prevent the first light receiving element from receiving light from the first light emitting element; and a second wall portion arranged between the second light emitting element and the second light receiving element in the predetermined direction to prevent the second light receiving element from receiving light from the second light emitting element.

20. The image forming apparatus according to claim 10, further comprising:

a first wall portion arranged between the first light emitting element and the first light receiving element in the predetermined direction to prevent the first light receiving element from receiving light from the first light emitting element;

a second wall portion arranged between the first light receiving element and the second light receiving element in the predetermined direction; and a third wall portion arranged between the second light emitting element and the second light receiving element in the predetermined direction to prevent the second light receiving element from receiving light from the second light emitting element.

* * * * *